United States Patent
Kuwahara et al.

(10) Patent No.: US 10,211,460 B2
(45) Date of Patent: Feb. 19, 2019

(54) POSITIVE ELECTRODE FOR BATTERY, AND BATTERY

(71) Applicant: GS Yuasa International Ltd., Kyoto-shi, Kyoto (JP)

(72) Inventors: Kazuo Kuwahara, Wakayama (JP); Shuichi Inaya, Wakayama (JP); Yuichi Ito, Kyoto (JP); Kohei Tsujita, Kyoto (JP); Mitsuhiko Samata, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 14/387,420

(22) PCT Filed: Apr. 2, 2013

(86) PCT No.: PCT/JP2013/002280
§ 371 (c)(1),
(2) Date: Sep. 23, 2014

(87) PCT Pub. No.: WO2013/150778
PCT Pub. Date: Oct. 10, 2013

(65) Prior Publication Data
US 2015/0028264 A1 Jan. 29, 2015

(30) Foreign Application Priority Data
Apr. 3, 2012 (JP) .................. 2012-085004

(51) Int. Cl.
*H01M 4/62* (2006.01)
*H01M 4/131* (2010.01)
(Continued)

(52) U.S. Cl.
CPC ........... *H01M 4/623* (2013.01); *H01M 4/131* (2013.01); *H01M 4/622* (2013.01); *H01M 4/505* (2013.01);
(Continued)

(58) Field of Classification Search
CPC .... H01M 4/623; H01M 4/505; H01M 4/5825; H01M 4/525; H01M 4/625; H01M 4/622
See application file for complete search history.

(56) References Cited

U.S. PATENT DOCUMENTS 6,770,397 B1 * 8/2004 Maeda et al. ............... 429/217
7,695,821 B2 * 4/2010 Han et al. .................. 428/500
(Continued)

FOREIGN PATENT DOCUMENTS

JP 2001-35496 2/2001
JP 2002100360 A2 4/2002
(Continued)

OTHER PUBLICATIONS

International Search Report dated Jun. 25, 2013 filed in PCT/JP2013/002280.
(Continued)

*Primary Examiner* — Peter F Godenschwager
*Assistant Examiner* — Andrew J. Oyer
(74) *Attorney, Agent, or Firm* — Rankin, Hill & Clark LLP

(57) ABSTRACT

A positive electrode for a battery includes a positive active material, a conductive agent, and a copolymer. The copolymer includes a constituent unit (a) represented by the following general formula (1) and a constituent unit (b) represented by the following general formula (2):

[Chemical Formula 1]

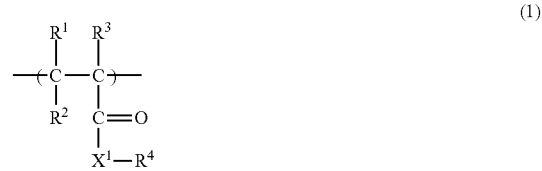

(1)

(Continued)

Mass ratio of dispersant A/conductive agent/%

-continued

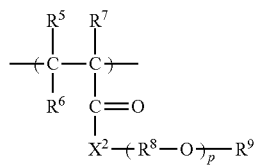

(wherein $R^1$, $R^2$, $R^3$, $R^5$, $R^6$, $R^7$ and $R^9$ are the same or different and denote a hydrogen atom, a methyl group or an ethyl group, $R^4$ denotes a hydrocarbon group having 8 to 30 carbon atoms, $R^8$ denotes a linear or branched alkylene group having 2 to 4 carbon atoms, $X^1$ and $X^2$ denote an oxygen atom or NH, and p denotes a number of 1 to 50).

24 Claims, 2 Drawing Sheets

(51) Int. Cl.
H01M 4/02 (2006.01)
H01M 4/525 (2010.01)
H01M 4/505 (2010.01)
H01M 4/58 (2010.01)

(52) U.S. Cl.
CPC .......... H01M 4/525 (2013.01); H01M 4/5825 (2013.01); H01M 4/625 (2013.01); H01M 2004/021 (2013.01)

(56) References Cited

U.S. PATENT DOCUMENTS

2007/0020525 A1* 1/2007 Kim ............... H01M 2/145
429/251
2011/0091775 A1* 4/2011 Lee ............... H01M 4/13
429/331

FOREIGN PATENT DOCUMENTS

| JP | 2002151057 A2 | 5/2002 |
| JP | 2002260666 A2 | 9/2002 |
| JP | 2003268053 A2 | 9/2003 |
| JP | 2004185826 A2 | 7/2004 |
| JP | 2004281055 A2 | 10/2004 |
| JP | 2005-5276 | 1/2005 |
| JP | 2005197073 A2 | 7/2005 |
| JP | 2006519883 T2 | 8/2006 |
| JP | 2010021059 A2 | 1/2010 |
| JP | 2011134649 A2 | 7/2011 |
| JP | 2011-181387 | 9/2011 |

OTHER PUBLICATIONS

Japanese Office Action dated May 23, 2017 issued in the corresponding Japanese patent application No. 2014-509055.

* cited by examiner

POSITIVE ELECTRODE FOR BATTERY, AND BATTERY

TECHNICAL FIELD

The present invention relates to a positive electrode for a battery, and a battery including the positive electrode.

BACKGROUND ART

A positive electrode for a nonaqueous electrolyte battery is produced by a method which includes producing a positive electrode paste in which a positive active material, a conductive agent and a binder are dispersed in a solvent, successively coating a current collector made of aluminum foil or the like with the positive electrode paste, and allowing the resultant to pass through a drying furnace so as to volatilize and remove the solvent. When a line speed of a step of coating an electrode plate is increased, a time during which the electrode plate retains in the drying furnace is shortened, thereby causing a shortage of drying.

In order to avoid this, a method of increasing a temperature or an air volume in the drying furnace to increase the drying speed is considered, but the following problem is caused: rapid drying may deteriorate the adhesiveness of a positive composite layer, or may make the concentration of a flammable gas in the drying furnace too high when an organic solvent is used.

Alternatively, a method for securing the retention time in the drying furnace by expanding the drying furnace is considered, but the following problem is caused: higher plant and equipment investment is required.

Examples of a method other than the above methods include a method of increasing a mass ratio of a solid in a positive electrode paste (hereinafter, referred to as "paste solid content"), that is, reducing the content of the solvent, thereby shortening the drying time. However, in this case, the viscosity of the paste is increased, and thus there is the following problem: coatability is deteriorated, for example, fading occurs.

Patent Document 1 discloses that a monomer is chemically bound to the surface of a conductive agent and then polymerized by heating, and the resultant is used for a positive electrode paste, thereby enabling to improve the dispersibility of the positive electrode paste and reduce the viscosity of the positive electrode paste. However, for chemically binding a polymer to the surface of a conductive agent, in general, a process of several stages of chemical reactions needs to be carried out with respect to a conductive agent, which includes fine particles and is difficult to be handled, so that the process may be complicated and production cost may be increased.

Patent Document 2 discloses that a surfactant can be added to thereby improve the dispersibility of a conductive agent in a positive electrode paste. However, it is essential to add and stir a dispersant before the conductive agent is loaded, and thus, a plurality of times of mixing operations are carried out and a reduction in production efficiency may be caused.

Patent Document 3 describes use of a dispersant in order to improve the fluidity of a positive electrode paste including a conductive agent having a large specific surface area in a large amount. However, no comparative data clarifying the viscosity reducing effect by this has been shown. Furthermore, only one dispersant is used herein, and therefore it is not clear whether or not the viscosity reducing effect can be obtained in all dispersants.

PRIOR ART DOCUMENTS

Patent Documents

Patent Document 1: JP-A-2002-100360
Patent Document 2: JP-A-2002-151057
Patent Document 3: JP-A-2005-197073

SUMMARY OF THE INVENTION

Problems to be Solved by the Invention

An object of the present invention is to provide a positive electrode having a short time required for production and high adhesiveness of a positive composite to a current collector, and a battery using the positive electrode.

Means for Solving the Problems

The present inventors have carried out various studies, and, as a result, they have found that when a copolymer having a specific structure is used as a dispersant, the difference in structure brings about large differences in viscosity reducing effect of a positive electrode paste and in adhesiveness of a composite layer of a positive electrode obtained by coating of the positive electrode paste.

Configurations and advantageous effects of the present invention are described along with technical ideas. However, mechanism of action includes estimations, and right or wrong thereof does not limit the present invention. It is to be noted that the present invention can be carried out without departing from the sprit or main feature thereof. Therefore, embodiments or experiment examples described later are merely simple examples in any senses, and they should not be construed with limitation. In addition, all modifications and changes within the equivalence of the claims are included in the present invention.

The present invention provides a positive electrode for a battery, including: a positive active material, a conductive agent, and a copolymer. The copolymer includes a constituent unit (a) represented by the following general formula (1) and a constituent unit (b) represented by the following general formula (2).

[Chemical Formula 1]

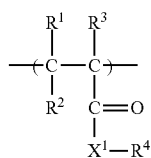

(1)

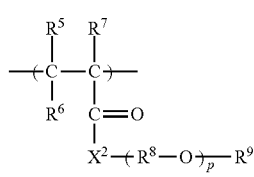

(2)

(In the formula, $R^1$, $R^2$, $R^3$, $R^5$, $R^6$, $R^7$, and $R^9$ are the same or different and denote a hydrogen atom, a methyl group or an ethyl group, $R^4$ denotes a hydrocarbon group having 8 to 30 carbon atoms, $R^8$ denotes a linear or branched alkylene group having 2 to 4 carbon atoms, $X^1$ and $X^2$ denote an oxygen atom or NH, and p denotes a number of 1 to 50.)

Furthermore, the present invention provides a positive electrode for a battery, which is produced by using a positive electrode paste for a battery, the paste including the positive active material, the conductive agent, a solvent, and the copolymer.

Furthermore, the present invention is a battery including the positive electrode for a battery.

Advantages of the Invention

According to the present invention, it is possible to provide a positive electrode having a short time required for production and having high adhesiveness of a positive composite to a current collector without deteriorating coatability of a positive electrode paste or adhesiveness of the positive composite after coating, and a battery using the positive electrode.

MODE FOR CARRYING OUT THE INVENTION

Figure 1:
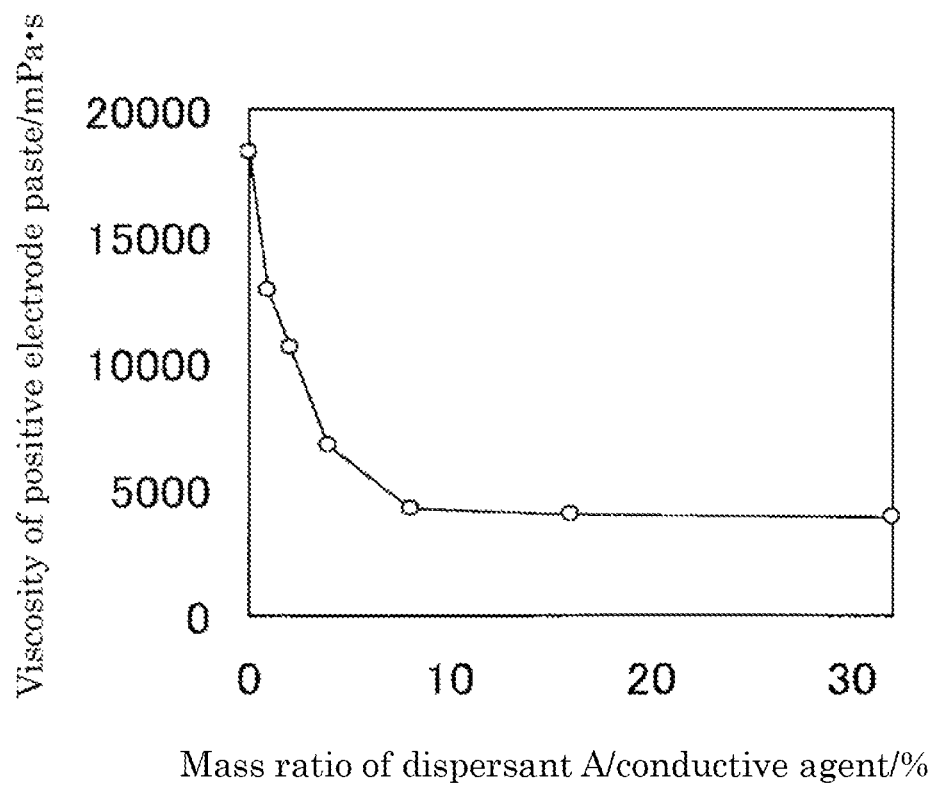
FIG. 1 is a graph showing a relationship between the amount of a copolymer added and the viscosity of a paste.

The present invention is based on a finding that when a positive electrode for a battery includes a positive active material, a conductive agent, and a copolymer including a constituent unit (a) represented by the general formula (1) and a constituent unit (b) represented by the general formula (2), it is possible to provide a positive electrode having a short time required for production and high adhesiveness of a positive composite to a current collector, and a battery using the positive electrode.

Furthermore, in production of the positive electrode for a battery, it is preferable to use a positive electrode paste for a battery, the paste including the positive active material, the conductive agent, a solvent, and the copolymer.

A mechanism in which the effect of the present invention is exerted is not clear, but the applicant has presumption as follows. It is considered that when the solid content of the positive electrode paste is increased, the positive active material or conductive agent particles in the paste aggregate so as to form a network three-dimensionally, thereby resulting in an increasing in viscosity. It is considered that the copolymer included in the positive electrode paste used for the positive electrode for a battery of the present invention brings about an effect of suppressing aggregation of particles in the paste because a constituent unit (a) having a hydrophobic group is firmly adsorbed to the positive active material or the particle surface of the conductive agent in the paste and a constituent unit (b) having a polyoxy alkylene group produces a strong steric repulsive force between particles, thereby reducing the viscosity of the paste.

Meanwhile, in order to produce a positive electrode, the positive electrode paste needs to keep excellent adhesiveness to aluminum foil or the like as a positive electrode current collector. But in general, a dispersant acts on an interface between the positive electrode current collector and the positive composite, thereby resulting in a reduction in adhesiveness. However, according to the present invention, the copolymer is firmly adsorbed to the positive active material or the particle surface of the conductive agent in the paste by the constituent unit (a) to reduce the solubility of the copolymer in the solvent, thereby suppressing bleeding out of the copolymer having dispersibility to the positive electrode current collector interface, and further improving the adhesiveness and improving the peeling strength of the positive composite. However, these are presumption and the present invention is not limited to these mechanisms.

Hereinafter, embodiments of the present invention are specifically described.

[Copolymer]

A copolymer used in the present invention includes a constituent unit (a) represented by the general formula (1) and a constituent unit (b) represented by the general formula (2).

In the general formula (1), from the viewpoint of an effect of reducing the viscosity of the positive electrode paste and the viewpoint of easiness of introduction of the constituent unit (a) to the copolymer, $R^1$ and $R^2$ are preferably a hydrogen atom, $R^8$ is preferably a hydrogen atom or a methyl group, and more preferably a methyl group. From the viewpoint of the effect of reducing the viscosity of the positive electrode paste and the viewpoint of maintaining the peel strength of the positive composite, $R^4$ is preferably an alkyl group or an alkenyl group. From the similar viewpoints, the number of carbon atoms of $R^4$ is 8 or more, preferably 10 or more and more preferably 12 or more, and from the similar viewpoints, it is preferably 26 or less, more preferably 22 or less and further preferably 20 or less. When these viewpoints are summarized, the number of carbon atoms of $R^4$ is preferably 8 to 26, more preferably 10 to 22 and further preferably 12 to 20. Specific examples of $R^4$ include an octyl group, a 2-ethylhexyl group, a decyl group, a lauryl group, a myristyl group, a cetyl group, a stearyl group, an oleyl group, and a behenyl group. From the viewpoint of easiness of introduction of the constituent unit (a) to the copolymer, $X^1$ is preferably an oxygen atom.

When the copolymer used in the present invention is synthesized, specific examples of a monomer giving the constituent unit (a) (hereinafter also referred to as "monomer (a)") include ester compounds such as 2-ethylhexyl (meth)acrylate, octyl (meth)acrylate, lauryl (meth)acrylate, stearyl (meth)acrylate, isostearyl (meth)acrylate and behenyl (meth)acrylate; and amide compounds such as 2-ethylhexyl (meth)acrylamide, octyl (meth)acrylamide, lauryl (meth)acrylamide, stearyl (meth)acrylamide and behenyl (meth)acrylamide. Among them, from the viewpoint of the effect of reducing the viscosity of the positive electrode paste and the viewpoint of the easiness of introduction of the constituent unit (a) to the copolymer, lauryl (meth)acrylate, stearyl (meth)acrylate and behenyl (meth)acrylate are preferable. Among these monomers, one or two or more of them can be used.

The rate of the constituent unit (a) in the copolymer used in the present invention is preferably 5% by mass or more, more preferably 10% by mass or more and further preferably 15% by mass or more from the viewpoint of the effect of reducing the viscosity of the positive electrode paste and viewpoint of maintaining the peel strength of the positive composite. Furthermore, from the similar viewpoints, the rate is preferably 90% by mass or less, more preferably 85% by mass or less, further preferably 80% by mass or less and still further preferably 72% by mass or less. When these viewpoints are summarized, the rate of the constituent unit (a) in the copolymer is preferably 5 to 90% by mass, more preferably 10 to 85% by mass, further preferably 15 to 80% by mass and still further preferably 15 to 72% by mass.

In the general formula (2), from the viewpoint of the improvement of the dispersibility of the positive active material and the conductive agent in the positive electrode paste as well as the viewpoint of easiness of introduction of the constituent unit (b) to the copolymer, $R^5$ and $R^6$ are preferably a hydrogen atom, and $R^7$ and $R^9$ are preferably a hydrogen atom or a methyl group and more preferably a methyl group. From the similar viewpoints, $R^8$ is preferably an ethylene group or a propylene group and more preferably an ethylene group. From the viewpoint of the effect of reducing the viscosity of the positive electrode paste and the viewpoint of easiness of introduction of the constituent unit (b) to the copolymer, p is preferably 1 or more, more preferably 2 or more and further preferably 3 or more. Furthermore, from the similar viewpoints, p is preferably 50 or less, more preferably 35 or less and further preferably 20 or less. When these viewpoints are summarized, p is preferably 1 to 50, more preferably 2 to 35, and further preferably 3 to 20. From the viewpoint of easiness of introduction of the constituent unit (b) to the copolymer, $X^2$ is preferably an oxygen atom.

Examples of the constituent unit (b) include a structure derived from a nonionic monomer, and a structure in which a nonionic group is introduced after polymerization.

Examples of a monomer giving the constituent unit (b) in synthesis of the copolymer used in the present invention (hereinafter, also referred to as "monomer (b)") include methoxy polyethylene glycol (meth)acrylate, methoxy poly(ethylene glycol/propylene glycol) mono(meth)acrylate, ethoxy poly(ethylene glycol/propylene glycol) mono(meth)acrylate, polyethylene glycol mono(meth)acrylate, polypropylene glycol mono(meth)acrylate, 2-methoxyethyl (meth)acrylamide, 2-ethoxyethyl (meth)acrylamide and 3-methoxypropyl (meth)acrylamide.

As the constituent unit (b), from the viewpoint of the improvement of the dispersibility of the positive active material and the conductive agent in the positive electrode paste, a monomer represented by the following general formula (3) is preferable.

[Chemical Formula 2]

(3)

(In the formula, $R^5$, $R^6$, $R^7$, and $R^9$ are the same or different and denote a hydrogen atom, a methyl group or an ethyl group, $R^8$ denotes a linear or branched alkylene group having 2 to 4 carbon atoms, $X^2$ denotes an oxygen atom or NH, and p denotes a number of 1 to 50).

In the general formula (3), from the viewpoints of the improvement of the dispersibility of the positive active material and the conductive agent in the positive electrode paste as well as easiness of introduction of the constituent unit (b) to the copolymer, $R^5$ and $R^6$ are preferably a hydrogen atom, and $R^7$ and $R^9$ are preferably a hydrogen atom or a methyl group and more preferably a methyl group. From the similar viewpoints, $R^8$ is preferably an ethylene group or a propylene group and more preferably an ethylene group. From the viewpoints of the effect of reducing the viscosity of the positive electrode paste and easiness of introduction of the constituent unit (b) to the copolymer, p is preferably 1 or more, more preferably 2 or more and further preferably 3 or more. Furthermore, from the similar viewpoints, p is preferably 50 or less, more preferably 35 or less and further preferably 20 or less. When these viewpoints are summarized, p is preferably 1 to 50, more preferably 2 to 35 and further preferably 3 to 20. From the viewpoint of easiness of introduction of the constituent unit (b) to the copolymer, $X^2$ is preferably an oxygen atom.

Among these monomers, one or two or more can be used.

From the viewpoints of the effect of reducing the viscosity of the positive electrode paste and maintaining the peel strength of the positive composite, the rate of the constituent unit (b) in the copolymer used in the present invention is preferably 10% by mass or more, more preferably 15% by mass or more, further preferably 20% by mass or more and still further preferably 23% by mass or more. Furthermore, from the similar viewpoints, the rate is preferably 85% by mass or less, more preferably 80% by mass or less and further preferably 75% by mass or less. When these viewpoints are summarized, the rate of the constituent unit (b) in the copolymer used in the present invention is preferably 10 to 85% by mass, more preferably 15 to 80% by mass, further more preferably 20 to 75% by mass and still further preferably 23 to 75% by mass.

The mass ratio (constituent unit (a)/constituent unit (b)) of the constituent unit (a) to the constituent unit (b) contained in the copolymer of the present invention is preferably 0.1 or more and more preferably 0.2 or more from the viewpoints of the effect of reducing the viscosity of the positive electrode paste and maintaining the peel strength of the positive composite. Furthermore, from the similar viewpoints, the ratio is preferably 10.0 or less, more preferably 5.33 or less, further preferably 4.0 or less and still further preferably 3.2 or less. When the above viewpoints are summarized, the mass ratio (constituent unit (a)/constituent unit (b)) of the constituent unit (a) to the constituent unit (b) contained in the copolymer of the present invention is preferably 0.1 to 10.0, more preferably 0.2 to 5.33, further preferably 0.2 to 4.0 and still further preferably 0.2 to 3.2.

The copolymer used in the present invention can include a constituent unit (c) other than the constituent unit (a) and the constituent unit (b). When the copolymer used in the present invention is synthesized, a monomer giving the constituent unit (c) (hereinafter, referred to as "monomer (c)") is not particularly limited as long as it can be copolymerized with the monomer (a) or the monomer (b), and one or two or more can be used.

Examples of the monomer (c) include acid monomers such as (meth)acrylic acid; (meth)acrylates such as methyl (meth)acrylate, ethyl (meth)acrylate, butyl (meth)acrylate, isobutyl (meth)acrylate, tert-butyl (meth)acrylate, benzyl (meth)acrylate, cyclohexyl (meth)acrylate, isobornyl (meth)acrylate, 2-hydroxyethyl (meth)acrylate and dimethylaminoethyl (meth)acrylate; (meth)acrylamides such as (meth)acrylamide, dimethyl (meth)acrylamide, isopropyl (meth)acrylamide and tert-butyl (meth)acrylamide; styrenes such as styrene and p-methyl styrene; vinyl esters such as vinyl acetate; vinyl pyridines such as 2-vinyl pyridine; and vinyl pyrrolidones such as vinyl pyrrolidone.

The total content of the constituent unit (a) and the constituent unit (b) in the copolymer of the present invention is preferably 40% by mass or more, further preferably 60% by mass or more, further preferably 80% by mass or more, still further preferably 90% by mass or more and yet further preferably 95% by mass or more from the viewpoint of the effect of reducing the viscosity of the positive electrode paste and the viewpoint of maintaining the peel strength of the positive composite.

The rate of the constituent unit (c) in the copolymer used in the present invention is preferably 0 to 60% by mass, more preferably 0 to 40% by mass, further preferably 0 to 30% by mass, still further preferably 0 to 20% by mass, yet further preferably 0 to 10% by mass and still further preferably 0 to 5% by mass from the viewpoint of the effect of reducing the viscosity of the positive electrode paste and the viewpoint of maintaining the peel strength of the positive composite. When the rate of the constituent unit (c) is 60% by mass or less, the contents of the constituent unit (a) and the constituent unit (b) in the paste are secured, so that the effect of reducing the viscosity of the positive electrode paste is enhanced.

The content of the copolymer in the positive electrode paste for a battery, which is used for the positive electrode for a battery of the present invention, is preferably 0.02% by mass or more, more preferably 0.05% by mass or more, further preferably 0.1% by mass or more and still further preferably 0.2% by mass or more from the viewpoint of the effect of reducing the viscosity of the positive electrode paste. Furthermore, from the viewpoint of maintaining the battery power, the content is preferably 1% by mass or less, more preferably 0.8% by mass or less, further preferably 0.6% by mass or less and still further preferably 0.5% by mass or less. When the viewpoints are summarized, the content of the copolymer in the positive electrode paste for a battery, which is used for the positive electrode for a battery of the present invention, is preferably 0.02 to 1% by mass, more preferably 0.05 to 0.8% by mass, further preferably 0.1 to 0.6% by mass and still further preferably 0.2 to 0.5% by mass.

The content of the copolymer in the positive electrode for a battery and the positive electrode paste for a battery, which is used for the positive electrode for a battery of the present invention, is preferably 0.5 parts by mass or more, more preferably 1.5 parts by mass or more, further preferably 3 parts by mass or more and still further preferably 6 parts by mass or more based on 100 parts by mass of the conductive agent from the viewpoints of maintaining the peel strength of the positive composite and the effect of reducing the viscosity of the positive electrode paste. Furthermore, from the viewpoint of maintaining the battery power, the content is preferably 35 parts by mass or less, more preferably 30 parts by mass or less, further preferably 25 parts by mass or less and still further preferably 20 parts by mass or less based on 100 parts by mass of the conductive agent. When the viewpoints are summarized, the content of the copolymer in the positive electrode for a battery and the positive electrode paste for a battery, which is used for the positive electrode for a battery of the present invention, is preferably 0.5 to 35 parts by mass, more preferably 1.5 to 30 parts by mass, further preferably 3 to 25 parts by mass and still further preferably 6 to 20 parts by mass.

The total content of the constituent unit (a) and the constituent unit (b) included in the copolymer in the positive electrode for a battery and the positive electrode paste for a battery, which is used for the positive electrode for a battery of the present invention, based on 100 parts by mass of the conductive agent is preferably 0.5 parts by mass or more, more preferably 1 part by mass or more, further preferably 2 parts by mass or more and still further preferably 5 parts by mass or more from the viewpoints of maintaining the peel strength of the positive composite and the effect of reducing the viscosity of the positive electrode paste. Furthermore, from the viewpoint of maintaining the battery power, the content is preferably 30 parts by mass or less, more preferably 25 parts by mass or less, further preferably 20 parts by mass or less and still further preferably 15 parts by mass or less. When the viewpoints are summarized, the total content of the constituent unit (a) and the constituent unit (b) included in the copolymer in the positive electrode for a battery and the positive electrode paste for a battery, which is used for the positive electrode for a battery of the present invention, based on 100 parts by mass of the conductive agent is preferably 0.5 to 30 parts by mass, more preferably 1 to 25 parts by mass, further more preferably 2 to 20 parts by mass and still further preferably 5 to 15 parts by mass.

The method for synthesizing the copolymer of the present invention is not particularly limited, and a method used for usual polymerization of (meth)acrylates is used. Examples of the method include a free radical polymerization method, a living radical polymerization method, an anion polymerization method and a living anion polymerization method. For example, when the free radical polymerization method is used, the copolymer can be obtained by a known method, for example, a solution polymerization method of a monomer component including the monomer (a) and the monomer (b).

Examples of a solvent used for solution polymerization include organic solvents such as hydrocarbons (hexane and heptane), aromatic hydrocarbons (toluene, xylene, and the like), lower alcohols (ethanol, isopropanol, and the like), ketones (acetone and methyl ethyl ketone), ethers (tetrahydrofuran and diethylene glycol dimethyl ether) and N-methyl pyrrolidone. The amount of the solvent is preferably 0.5 to 10 times as large as the total amount of the monomer in the mass ratio.

As the polymerization initiator, a known radical polymerization initiator can be used. Examples of the polymerization initiator include azo polymerization initiators, hydroperoxides, dialkyl peroxides, diacyl peroxides and ketone peroxides. The amount of the polymerization initiator is preferably 0.01 to 5% by mol, more preferably 0.01 to 3% by mol and particularly preferably 0.01 to 1% by mol based on the total amount of monomer component. The polymerization reaction is preferably carried out under a nitrogen stream in a temperature range of 60° C. to 180° C., and the reaction time is preferably 0.5 to 20 hours.

Furthermore, in order to adjust the molecular weight, a known chain transfer agent can be used. Examples thereof include isopropyl alcohol, and mercapto compounds such as mercaptoethanol.

In the copolymer of the present invention, the sequence of the constituent unit (a) and the constituent unit (b) may be random, block, or graft. Furthermore, a constituent unit other than these constituent units may be included.

The weight average molecular weight of the copolymer is preferably 9000 or more, more preferably 15000 or more, further preferably 30000 or more and still further preferably 50000 or more from the viewpoint of maintaining the peel strength of the positive composite. Furthermore, from the viewpoint of the effect of reducing the viscosity of the positive electrode paste, the weight average molecular weight of the copolymer is preferably 1000000 or less, more preferably 800000 or less, further preferably 600000 or less and still further preferably 500000 or less. When the viewpoints are summarized, the weight average molecular weight of the copolymer is preferably 9000 to 1000000, more preferably 15000 to 800000, further more preferably 30000 to 600000 and still further preferably 45000 to 500000. It is to be noted that the weight average molecular weight is a value measured by GPC (gel permeation chromatography), and the details of the measurement conditions are shown in Example.

In the positive electrode for a battery and the positive electrode paste for a battery, which is used for the positive electrode for a battery of the present invention, a dispersant other than the copolymer may be contained. In the positive electrode for a battery and the positive electrode paste for a battery, which is used for the positive electrode for a battery, of the present invention, the content of the copolymer based on the total amount of the copolymer and the dispersant other than the copolymer is preferably 40% by mass or more, more preferably 60% by mass or more, further preferably 80% by mass or more and still further preferably 100% by mass.

[Positive Active Material]

The positive active material is not particularly limited as long as it is an inorganic compound, and, for example, a compound having an olivine structure and lithium transition metal composite oxide can be used. Examples of the compound having an olivine structure include a compound represented by general formula: $Li_xM1_sPO_4$ (wherein M1 denotes 3d transition metal, $0 \leq x \leq 2$, $0.8 \leq s \leq 1.2$). The compound having an olivine structure may be coated with amorphous carbon or the like. Examples of the lithium transition metal composite oxide include lithium manganese oxide having a spinel structure, and lithium transition metal composite oxide having a layered structure and represented by general formula: $Li_xMO_{2-\delta}$ (wherein M denotes transition metal, $0.4 \leq x \leq 1.2$, $0 \leq \delta \leq 0.5$). The transition metal M may be metal including Co, Ni or Mn. The lithium transition metal composite oxide may contain one or two or more elements selected from Al, Mn, Fe, Ni, Co, Cr, Ti, Zn, P and B.

[Conductive Agent]

As the conductive agent, it is preferable to use a carbon-based conductive agent. Examples of the carbon-based conductive agent include carbon black such as acetylene black, furnace black and ketjen black, and graphite. A conductive polymer other than a carbon-based polymer, for example, polyaniline may be used.

[Binder]

As a binder, polyvinylidene fluoride (PVDF), a vinylidene fluoride-hexafluoropropylene copolymer, a styrene-butadiene rubber, polyacrylonitrile, and the like can be used alone or as a mixture thereof.

[Positive Electrode Paste]

The positive electrode paste is produced by mixing and stirring the above-mentioned copolymer, positive active material, conductive agent, binder, solvent for adjusting the solid content, and the like. Other dispersant, functional material, and the like may be added thereto. As the solvent, a nonaqueous solvent such as N-methyl-2-pyrrolidone (NMP), dimethylformamide (DMF) or dimethylsulfoxide (DMSO), water, or the like can be used. Furthermore, in the positive electrode paste of the present invention, a nonaqueous solvent is preferably used and, in particular, NMP is preferably used.

For mixing and stirring, a planetary mixer, a bead mill, a jet mill, or the like can be used. Furthermore, they may be used in combination.

When materials are loaded, they may be loaded while a stirring blade is rotated. This allows preliminarily mixing of each material for suppression of the mechanical load of a stirrer and reduction of the bulk of each material in a stirrer container. Furthermore, the whole amount of each material is not loaded at one time but loaded in portions. Thus, the mechanical load of a stirrer can be suppressed.

The copolymer of the present invention may be used as a solid substance, or can be used in a state in which it is previously dissolved in a solvent such as a nonaqueous solvent or water. Patent Document 2 discloses that it is essential to add a dispersant before a binder is loaded because the dispersant avoids aggregation in which fluorine-based binders are made into fibers. However, in the copolymer according to the present invention, the copolymer may be loaded in any stage in a kneading step because the copolymer has extremely high affinity to the solvent and the binder component in the positive electrode paste, and a plurality of kneading steps can be carried out before and after the copolymer is loaded. For example, it is preferable that the copolymer is loaded in the early stage of a kneading step because the viscosity of the paste is reduced and the mechanical load of a kneading device and necessary energy are reduced as well as the solid content of the paste can be increased, which lead to the improvement in productivity of the positive electrode and the reduction in production cost of a battery. It is preferable that the copolymer is loaded in the later stage of the kneading step or immediately before the paste is completed because the viscosity of the paste is kept high, and strong shear stress is added to the paste in the kneading step until the copolymer is loaded, so that a dispersing state of the paste is improved, contributing to a long life of the battery. Furthermore, when the copolymer is mixed with only powder components such as the positive active material and the conductive agent at the same time, insoluble matter may be generated, and therefore, the copolymer may be loaded in a stage in which each material is paste. For example, the copolymer may be loaded together with the binder or the solvent before the powder materials are loaded, or the polymer may be loaded after the binder or the solvent and a part or all part of the powder materials are mixed with each other. Alternatively, the copolymer can be mixed in a solution of the binder in advance.

[Positive Electrode]

A positive electrode is produced by coating a current collector such as aluminum foil with the positive electrode paste, and drying the resultant. In order to increase the density of the positive electrode, compaction can be carried out by a press machine.

For coating of the positive electrode paste, a die head, a comma reverse roller, a direct roller, a gravure roll, or the like may be used. Drying after coating can be carried out by warming, air flow, irradiation with infrared ray, and the like, alone or in combination thereof.

Pressing of the positive electrode can be carried out by using, for example, a roll press machine.

In the positive electrode for a battery of the present invention, the peel strength of a positive composite described in Examples below is preferably more than 120 gf, more preferably 250 gf or more and further more preferably 375 gf or more from the viewpoint that charge-discharge characteristics of a battery are practically durable.

Furthermore, in the positive electrode for a battery of the present invention, from the viewpoint of securing safety of the battery, it is preferable that the exfoliation of the composite, having a width of 1 mm or more, is not observed when the positive electrode is cut in a cutting test of the positive electrode described in Examples below.

[Battery]

Figure 2:
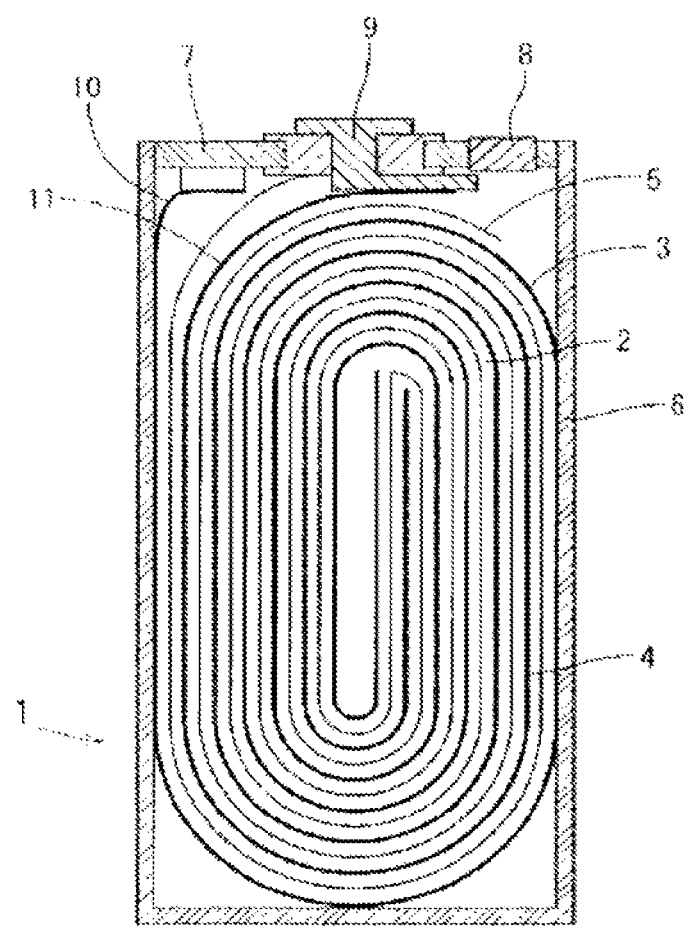
FIG. 2 is a sectional view of a battery in accordance with a first embodiment.

FIG. 2 is a schematic sectional view of a prismatic nonaqueous electrolyte secondary battery 1 in accordance with one embodiment of the present invention. This nonaqueous electrolyte secondary battery 1 accommodates a power generating element 2 and a nonaqueous electrolyte solution in a battery case 6. The power generating element 2 is made by winding a positive electrode 3 formed by coating a positive electrode current collector made of aluminum foil with a positive composite, and a negative electrode 4 formed by coating a negative electrode current collector made of copper foil with a negative composite with a separator 5 interposed therebetween in a spiral shape.

A battery lid 7 provided with a safety valve 8 is attached to the battery case 6 by laser welding, a negative plate 4 is connected to a negative electrode terminal 9 provided on the upper part of the battery case 6 via a negative electrode lead 11, and the positive electrode 3 is connected to the battery lid 7 via a positive electrode lead 10.

The nonaqueous electrolyte solution is obtained by dissolving an electrolyte salt in a nonaqueous solvent. Examples of the nonaqueous solvent include polar solvents such as ethylene carbonate, propylene carbonate, γ-butyrolactone, dimethyl carbonate, ethyl methyl carbonate, diethyl carbonate, sulfolane, dimethylsulfoxide, acetonitrile, dimethylformamide, dimethylacetamide, 1,2-dimethoxyethane, 1,2-diethoxyethane, tetrahydrofuran, 2-methyl tetrahydrofuran, dioxolane, methyl acetate and vinylene carbonate. Such solvents can be used alone or in combination of two or more of them.

Examples of the electrolyte salt dissolved in the nonaqueous solvent include $LiPF_6$, $LiClO_4$, $LiBF_4$, $LiAsF_6$, $LiCF_3CO_2$, $LiCF_3(CF_4)_3$, $LiCF_3(C_2F_5)_3$, $LiCF_3SO_3$, $LiN(SO_2CF_3)_2$, $LiN(SO_2CF_2CF_3)_2$, $LiN(COCF_3)_2$, $LiN(COCF_2CF_3)_2$ and $LiPF_3(CF_2CF_3)_3$. Such salts can be used alone or in combination of two or more of them.

Instead of the nonaqueous electrolyte solution, a solid electrolyte may be used, and both the nonaqueous electrolyte solution and the solid electrolyte may be used. As the solid electrolyte, a known solid electrolyte can be used, and, for example, an inorganic solid electrolyte or a polymer solid electrolyte can be used. When a gel-like polymer solid electrolyte is used, an electrolyte solution constituting a gel and an electrolyte solution contained in pores of an active material of an electrode plate may be different from each other. Furthermore, a synthetic resin microporous film, a polymer solid electrolyte, and the like can be used in combination.

Hereinafter, an example in which a prismatic battery case is used is described, but a battery case may have an oblong shape, a cylindrical shape or a bag shape, and a metal laminate resin film or the like may be employed.

The power generating element 2 accommodated in the battery case 6 is configured by winding the positive electrode 3 and the negative electrode 4 with the separator 5 sandwiched therebetween.

As the separator 5, a woven fabric, a non-woven fabric, a synthetic resin microporous film or the like can be used, and in particular, a synthetic resin microporous film can be suitably used. Among them, a polyolefin microporous film such as polyethylene and polypropylene microporous films, or a composite microporous film thereof can be suitably used in terms of the thickness, film strength, film resistance and the like.

Next, the negative plate 4 is described. The negative plate 4 is provided with a negative composite layer containing a negative active material capable of absorbing and releasing lithium ions on both surfaces of a negative electrode current collector made of copper foil formed of metal such as copper and having a thickness of 5 to 30 μm. In a part which is not provided with a negative electrode composite layer of the negative electrode current collector, the negative electrode lead 11 is welded by ultrasonic welding.

As the negative active material contained in the negative composite layer, an alloy of Al, Si, Pb, Sn, Zn, Cd or the like and lithium; a metal oxide such as $LiFe_2O_3$, $WO_2$, $MoO_2$, SiO or CuO; a carbonaceous material such as graphite and carbon; lithium nitride such as $Li_5(Li_3N)$; or metallic lithium, or a mixture thereof can be used.

EXAMPLES

Hereinafter, Examples and Comparative Examples of the present invention are shown, but the present invention is not limited thereto.

Hereinafter, the details of copolymers and homopolymers used in Examples and Comparative Examples are shown in Table 1. Herein, abbreviations of raw materials shown in Table 1 and used in Examples below are as follows.

LMA: lauryl methacrylate (manufactured by MITSUBISHI GAS CHEMICAL COMPANY, INC., Product number: GE-410) ($R^4$: $C_{12}H_{25}$)

SMA: stearyl methacrylate (manufactured by Shin Nakamura Chemical Co., Ltd.; Product number: NK-ester S) ($R^4$: $C_{18}H_{37}$)

BHMA: behenyl methacrylate (manufactured by Shin Nakamura Chemical Co., Ltd.; Product number: NK-ester BH) ($R^4$: $C_{22}H_{45}$)

PEG (2) MA: methoxy polyethylene glycol methacrylate (manufactured by Shin Nakamura Chemical Co., Ltd.; Product number: NK-ester M-20G; Average addition molar number p of ethylene oxide: 2)

PEG (9) MA: methoxy polyethylene glycol methacrylate (manufactured by Shin Nakamura Chemical Co., Ltd.; Product number: NK-ester M-90G; Average addition molar number p of ethylene oxide: 9)

PEG (23) MA: methoxy polyethylene glycol methacrylate (manufactured by Shin Nakamura Chemical Co., Ltd.; Product number: NK-ester TM-230G; Average addition molar number p of ethylene oxide: 23)

MAA: methacrylic acid (manufactured by Wako Pure Chemical Industries, Ltd.)

MPD: 3-mercapto 1,2-propanediol (manufactured by Wako Pure Chemical Industries, Ltd.)

n-DM: dodecyl mercaptan (manufactured by Tokyo Chemical Industry Co., Ltd.)

NMP: n-methyl-2-pyrrolidone (manufactured by Wako Pure Chemical Industries, Ltd.)

hexane: n-hexane (manufactured by Wako Pure Chemical Industries, Ltd.)

V-65B: 2,2'-azobis(2,4-dimethyl valeronitrile) (manufactured by Wako Pure Chemical Industries, Ltd.)

TABLE 1

| | | | Name of copolymer (polymer) | | | | | | | | |
|---|---|---|---|---|---|---|---|---|---|---|---|
| | | | Copolymer | | | | | | | | |
| | | | CP-01 A | CP-02 B | CP-03 C | GP-06 D | GP-07 E | K-1 F | K-2 G | K-4 H | K-5 I |
| Initial charge monomer solution (g) | Monomer (a) | LMA | | | | | | | | | 8 |
| | | SMA | 3 | 3 | 3 | 8 | 12 | 3 | 3 | | |
| | | BHMA | | | | | | | | 80 | |
| | Monomer (b) | PEG(2)MA | | | | | | | | | |
| | | PEG(4)MA | | | | | | | | | |
| | | PEG(9)MA | | | | 11 | 7 | 14 | 14 | 110 | 11 |
| | | PEG(23)MA | 14 | 14 | 14 | | | | | | |
| | Monomer (c) | MAA | 3 | 3 | 3 | 1 | 1 | 3 | 3 | 10 | 1 |
| | Chain transfer agent | MPD | | 0.01 | 0.1 | | | | | | |
| | | n-DM | | | | | | | 0.6 | | |
| | Solvent | NMP | 17 | 17 | 17 | 12.3 | 12.3 | 12.8 | 19.4 | 190 | 19 |
| | | Hexane | | | | | | | | | |
| Initiator solution (g) | Initiator | V-66B | 0.6 | 0.6 | 0.6 | 0.2 | 0.2 | 0.1 | 0.6 | 2 | 0.2 |
| | Solvent | NMP | 3 | 3 | 3 | 1 | 1 | 0.5 | 1.2 | 10 | 1 |
| | | Hexane | | | | | | | | | |
| Dropping monomer solution (g) | Monomer (a) | LMA | | | | | | | | | 72 |
| | | SMA | 27 | 27 | 27 | 72 | 108 | 27 | 27 | | |
| | | BHMA | | | | | | | | | |
| | Monomer (b) | PEG(2)MA | | | | | | | | | |
| | | PEG(4)MA | | | | | | | | | |
| | | PEG(9)MA | | | | 99 | 63 | 126 | 126 | | 99 |
| | | PEG(23)MA | 126 | 126 | 126 | | | | | | |
| | Monomer (c) | MAA | 27 | 27 | 27 | 9 | 9 | 27 | 27 | | 9 |
| | Chain transfer agent | MPD | | 0.09 | 0.9 | | | | | | |
| | | n-DM | | | | | | | 5.4 | | |
| | Solvent | NMP | 153 | 153 | 153 | 111 | 111 | 102 | 147.6 | | 144 |
| Dropping initiator solution (g) | Initiator | V-65B | 5.4 | 5.4 | 5.4 | 1.8 | 1.8 | 0.9 | 5.4 | | 1.8 |
| | Solvent | NMP | 27 | 27 | 27 | 9 | 9 | 18 | 32.4 | | 36 |
| % by mass | Constituent unit (a) | | 15 | 15 | 15 | 40 | 60 | 15 | 15 | 40 | 40 |
| | Constituent unit (b) | | 70 | 70 | 70 | 55 | 35 | 70 | 70 | 55 | 55 |
| | Constituent unit (c) | | 15 | 15 | 15 | 5 | 5 | 15 | 15 | 5 | 5 |
| (a)/(b) | | | 0.21 | 0.21 | 0.21 | 0.73 | 1.71 | 0.21 | 0.21 | 0.73 | 0.73 |
| Non-volatile content (% by mass) | | | 40 | 40 | 40 | 40 | 40 | 59 | 50 | 46 | 49 |
| Weight average molecular weight | | | 55000 | 35000 | 20000 | 108000 | 57000 | 440000 | 8000 | 221000 | 126000 |

| | | | Name of copolymer (polymer) | | | | | | | |
|---|---|---|---|---|---|---|---|---|---|---|
| | | | Copolymer | | | | | | | Copolymer |
| | | | K-6 J | K-7 K | K-8 L | GP-04 M | GP-05 N | GP-08 O | K-11 P | Polymer Q | GP-09 R |
| Initial charge monomer solution (g) | Monomer (a) | LMA | | | | | | 16 | 16 | | 8 |
| | | SMA | 80 | 80 | 8 | | | | | 200 | 8 |
| | | BHMA | | | | | | | | | |
| | Monomer (b) | PEG(2)MA | 110 | | | | | | | | |
| | | PEG(4)MA | | | | | | | | | |
| | | PEG(9)MA | | | 12 | | | 4 | | | 4 |
| | | PEG(23)MA | | 110 | | 17 | 17 | | 4 | | |
| | Monomer (c) | MAA | 10 | 10 | | 3 | 3 | | | | |
| | Chain transfer agent | MPD | | | | | 0.01 | | | | |
| | | n-DM | | | | | | | | | |
| | Solvent | NMP | 198 | 198 | 12.3 | 19.8 | 19.8 | 19 | 19 | | 12.3 |
| | | Hexane | | | | | | | | 180 | |
| Initiator solution (g) | Initiator | V-66B | 2 | 2 | 0.2 | 0.2 | 0.2 | 0.2 | 0.2 | 2.2 | 0.2 |
| | Solvent | NMP | 4 | 4 | 1 | 1 | 1 | 1 | 1 | | 1 |
| | | Hexane | | | | | | | | 20 | |
| Dropping monomer solution (g) | Monomer (a) | LMA | | | | | | 144 | 144 | | 72 |
| | | SMA | | | 72 | | | | | | 72 |
| | | BHMA | | | | | | | | | |
| | Monomer (b) | PEG(2)MA | | | | | | | | | |
| | | PEG(4)MA | | | | | | | | | |
| | | PEG(9)MA | | | 108 | | | 36 | | | 36 |
| | | PEG(23)MA | | | | 153 | 153 | | 36 | | |
| | Monomer (c) | MAA | | | | 27 | 27 | | | | |
| | Chain transfer agent | MPD | | | | | 0.09 | | | | |
| | | n-DM | | | | | | | | | |
| | Solvent | NMP | | | 102 | 171 | 171 | 144 | 144 | | 84 |
| Dropping initiator solution (g) | Initiator | V-65B | | | 1.8 | 1.8 | 1.8 | 1.8 | 1.8 | | 1.8 |
| | Solvent | NMP | | | 1.8 | 9 | 9 | 36 | 36 | | 36 |

TABLE 1-continued

| % by mass | Constituent unit (a) | 40 | 40 | 40 | 0 | 0 | 80 | 80 | 100 | 80 |
| --- | --- | --- | --- | --- | --- | --- | --- | --- | --- | --- |
| | Constituent unit (b) | 55 | 55 | 60 | 85 | 86 | 20 | 20 | 0 | 20 |
| | Constituent unit (c) | 5 | 5 | 0 | 15 | 15 | 0 | 0 | 0 | 0 |
| (a)/(b) | | 0.73 | 0.73 | 0.67 | 0.00 | 0.00 | 4.00 | 4.00 | — | 4.00 |
| Non-volatile content (% by mass) | | 40 | 38 | 59 | 40 | 40 | 46 | 46 | 100 | 40 |
| Weight average molecular weight | | 120000 | 93000 | 101000 | 46000 | 35000 | 44000 | 42000 | 69000 | 53000 |

| | | | Name of copolymer (polymer) Copolymer | | | | | | |
| --- | --- | --- | --- | --- | --- | --- | --- | --- | --- |
| | | | GP-10 S | GP-11 T | GP-13 U | GP-14 V | GP-15 W | GP-16 X | GP-18 Y |
| Initial charge monomer solution (g) | Monomer (a) | LMA | | | | | 16 | | |
| | | SMA | 12 | 13 | 12 | 12 | | 10 | 8 |
| | | BHMA | | | | | | | |
| | Monomer (b) | PEG(2)MA | 8 | 7 | 7 | | 4 | 10 | 12 |
| | | PEG(4)MA | | | | 8 | | | |
| | | PEG(9)MA | | | | | | | |
| | | PEG(23)MA | | | | | | | |
| | Monomer (c) | MAA | | | | 1 | | | |
| | Chain transfer agent | MPD | | | | | | | |
| | | n-DM | | | | | | | |
| | Solvent | NMP | 12.3 | 12.3 | 12.3 | 12.3 | 19.0 | 12.3 | 12.3 |
| | | Hexane | | | | | | | |
| Initiator solution (g) | Initiator | V-66B | 0.2 | 0.2 | 0.2 | 0.2 | 0.2 | 0.2 | 0.2 |
| | Solvent | NMP | 1 | 1 | 1 | 1 | 1 | 1 | 1 |
| | | Hexane | | | | | | | |
| Dropping monomer solution (g) | Monomer (a) | LMA | | | | | 144 | | |
| | | SMA | 108 | 117 | 108 | 108 | | 90 | 72 |
| | | BHMA | | | | | | | |
| | Monomer (b) | PEG(2)MA | 72 | 63 | 63 | | 36 | 90 | 108 |
| | | PEG(4)MA | | | | 72 | | | |
| | | PEG(9)MA | | | | | | | |
| | | PEG(23)MA | | | | | | | |
| | Monomer (c) | MAA | | | | 9 | | | |
| | Chain transfer agent | MPD | | | | | | | |
| | | n-DM | | | | | | | |
| | Solvent | NMP | 93 | 93 | 93 | 93 | 144 | 93 | 93 |
| Dropping initiator solution (g) | Initiator | V-65B | 1.8 | 1.8 | 1.8 | 1.8 | 1.8 | 1.8 | 1.8 |
| | Solvent | NMP | 27 | 27 | 27 | 27 | 36 | 27 | 27 |
| % by mass | Constituent unit (a) | | 60 | 65 | 60 | 60 | 80 | 50 | 40 |
| | Constituent unit (b) | | 40 | 35 | 35 | 40 | 20 | 50 | 60 |
| | Constituent unit (c) | | 0 | 0 | 5 | 0 | 0 | 0 | 0 |
| (a)/(b) | | | 1.50 | 1.86 | 1.71 | 1.50 | 4.00 | 1.00 | 0.67 |
| Non-volatile content (% by mass) | | | 40 | 40 | 40 | 40 | 39 | 41 | 41 |
| Weight average molecular weight | | | 78000 | 61000 | 82000 | 100000 | 53000 | 88000 | 87000 |

| | | | Name of copolymer (polymer) Copolymer | | | | | |
| --- | --- | --- | --- | --- | --- | --- | --- | --- |
| | | | GP-20 Z | GP-21 AA | GP-25 AB | GP-26 AC | GP-27 AD | K-3 AE |
| Initial charge monomer solution (g) | Monomer (a) | LMA | | | | | | |
| | | SMA | 8.9 | 8.9 | 16 | 16 | 14.32 | 160 |
| | | BHMA | | | | | | |
| | Monomer (b) | PEG(2)MA | | | | | | |
| | | PEG(4)MA | | | | | | |
| | | PEG(9)MA | 5.1 | | | 4 | 4.72 | 30 |
| | | PEG(23)MA | | 5.1 | 3.0 | | | |
| | Monomer (c) | MAA | 6 | 6 | 1.0 | | 1.0 | 10.0 |
| | Chain transfer agent | MPD | | | | | | |
| | | n-DM | | | | | | |
| | Solvent | NMP | 29.0 | 29.0 | 19.0 | 19.0 | 19.0 | 168.0 |
| | | Hexane | | | | | | |
| Initiator solution (g) | Initiator | V-66B | 0.2 | 0.2 | 0.2 | 0.2 | 0.2 | 2 |
| | Solvent | NMP | 1 | 1 | 1.01 | 1.26 | 1.01 | 4.00 |
| | | Hexane | | | | | | |
| Dropping monomer solution (g) | Monomer (a) | LMA | | | | | | |
| | | SMA | 79.6 | 79.6 | 144 | 144 | 128.7 | |
| | | BHMA | | | | | | |
| | Monomer (b) | PEG(2)MA | | | | | | |
| | | PEG(4)MA | | | | | | |
| | | PEG(9)MA | 46.4 | | | 36 | 42.3 | |
| | | PEG(23)MA | | 46.4 | 27.0 | | | |

TABLE 1-continued

|  |  |  |  |  |  |  |  |  |
|---|---|---|---|---|---|---|---|---|
|  | Monomer (c) | MAA | 54 | 54 | 9.0 |  | 9.0 |  |
|  | Chain | MPD |  |  |  |  |  |  |
|  | transfer agent | n-DM |  |  |  |  |  |  |
|  | Solvent | NMP | 243 | 243 | 162 | 162 | 162 |  |
| Dropping | Initiator | V-65B | 1.8 | 1.8 | 1.84 | 1.84 | 1.84 |  |
| initiator | Solvent | NMP | 27 | 27 | 18 | 18 | 18 |  |
| solution (g) |  |  |  |  |  |  |  |  |
| % by mass | Constituent unit (a) |  | 44 | 44 | 80 | 80 | 71 | 80 |
|  | Constituent unit (b) |  | 26 | 26 | 15 | 20 | 24 | 15 |
|  | Constituent unit (c) |  | 30 | 30 | 5 | 0 | 5 | 5 |
| (a)/(b) |  |  | 1.72 | 1.72 | 5.32 | 4.00 | 3.04 | 5.33 |
| Non-volatile content (% by mass) |  |  | 39 | 39 | 49 | 49 | 49 | 40 |
| Weight average molecular weight |  |  | 95000 | 100000 | 69000 | 46000 | 36000 | 56000 |

Synthesis Example 1 of Copolymer

As an "initial charge monomer solution," a mixed solution made of 3 g of SMA, 14 g of PEG (23) MA, 3 g of MAA and 17 g of NMP was produced.

As a "dropping monomer solution," a mixed solution made of 27 g of SMA, 126 g of PEG (23) MA, 27 g of MAA and 153 g of NMP mixed liquid was produced. As an "initiator solution," a mixed solution made of 0.6 g of V-65B and 3 g of NMP was produced. As a "dropping initiator solution," a mixed solution made of 5.4 g of V-65B and 27 g of NMP was produced.

The whole amount of the "initial charge monomer solution" was loaded into a separable flask (reaction tank) provided with a reflux tube, a stirrer, a thermometer and a nitrogen introduction tube. The inside of the reaction tank was flushed with nitrogen and heated to a temperature in the tank (temperature of the charge raw material) of 65° C. After the temperature in the tank reached 65° C., the whole amount of the "the initiator solution" was added to the inside of the tank while the inside of the tank was stirred. Next, the "dropping monomer solution" and the "dropping initiator solution" were simultaneously dropped over three hours. After dropping was finished, stirring was further carried out at 65° C. for one hour. Next, while stirring was further carried out, the temperature in the tank was raised to 75° C. over about 30 minutes. After the temperature was raised, the inside was further stirred for two hours. Then, the temperature in the tank was cooled in water bath to 40° C. or lower. For adjusting the concentration, NMP was added to the tank and stirred to obtain an NMP solution of copolymer A. The non-volatile content of the solution of copolymer A was 40% by mass, and the weight average molecular weight of copolymer A was 55000.

Synthesis Example 2 of Copolymer

Copolymers B to AE were synthesized by the same method as in the above Synthesis Example 1 of copolymer except that the compositions of the "initial charge monomer solution," the "dropping monomer solution," the "initiator solution," and the "dropping initiator solution" were changed according to the description in Table 1. In the syntheses of copolymers H, J, K and AE, a batch polymerization method in which all monomers and all initiators were charged in the first stage was employed.

Synthesis Example of Homopolymer

The whole amount of a mixed solution (initial charge monomer solution) made of 200 g of SMA and 180 g of hexane was loaded into a separable flask (reaction tank) provided with a reflux tube, a stirrer, a thermometer and a nitrogen introduction tube. The inside of the reaction tank was flushed with nitrogen and heated to a temperature in the tank (temperature of the charge raw material) of 65° C. After the temperature in the tank reached 65° C., a mixed solution (initiator solution) made of 2.2 g of V-65B and 20 g of hexane was added while the inside of the tank was stirred. Furthermore, after the inside of the tank was stirred at 65° C. for five hours, the temperature in the tank was cooled in water bath to 40° C. or lower. To the obtained solution of homopolymer Q in hexane, 10 times as much ethanol (manufactured by Wako Pure Chemical industries, Ltd.) in a volume ratio was loaded in a beaker, and the obtained solution of homopolymer Q was dropped into the beaker while the content of the beaker was stirred. The precipitated solid was separated by filtration, and dried in a reduced pressure dryer at 10 kPa and 80° C. for 12 hours to obtain homopolymer Q. The weight average molecular weight of homopolymer Q was 69000. To 10 g of homopolymer Q obtained was added 90 g of NMP and stirred at 80° C. for 30 minutes, but it was not dissolved. Therefore, a positive electrode paste using homopolymer Q could not be produced.

[Measurement of Non-Volatile Content]

The non-volatile content of the copolymer solution was measured as follows. Into a petri dish, 10 g of dry sodium sulfuric anhydride and a glass rod were loaded, and the total mass was measured and the measured mass was defined as $W_3$ (g). Furthermore, 2 g of an NMP solution of each of the copolymers obtained in Synthesis Examples 1 and 2 of copolymer was loaded in this petri dish as a sample, and the total mass was measured and the measured mass was defined as $W_1$ (g). The dry sodium sulfuric anhydride and the sample were mixed by using the glass rod in the petri dish, and while the dry sodium sulfuric anhydride and the sample mixed with each other by using the glass rod, and the glass rod were still loaded in the petri dish, the whole of the petri dish was dried in a reduced pressure dryer at 140° C. (under a nitrogen stream at a pressure of 40 kPa) for 12 hours. After the petri dish was dried, the mass of the whole of the petri dish was measured and the measured mass was defined as $W_2$ (g). A value calculated from the following expression was defined as the non-volatile content.

Non-volatile content (% by mass)=100−($W_1$−$W_2$)/($W_1$−$W_3$)×100

[Measurements of Weight Average Molecular Weights of Copolymer and Homopolymer]

The weight average molecular weight of each copolymer was measured by the GPC method. The detailed conditions are as follows.

Measurement device: HLC-8320GPC (manufactured by Tosoh Corporation)
Column: α-M+α-M (manufactured by Tosoh Corporation)
Column temperature: 40° C.
Detector: differential refractive index
Eluting solvent: N,N-dimethylformamide (DMF) solution of 60 mmol/L of $H_3PO_4$ and 50 mmol/L of LiBr
Flow velocity: 1 mL/min
Standard sample to be used for calibration curve: monodisperse polystyrene manufactured by Tosoh Corporation, $5.26\times10^2$, $1.02\times10^5$, $8.42\times10^6$; monodisperse polystyrene manufactured by Nishio Kogyo KK, $4.0\times10^3$, $3.0\times10^4$, $9.0\times10^5$ (each number denotes a molecular weight)
Sample solution: DMF solution containing a solid content of a copolymer in 0.5% by weight
Amount of sample solution injected: 100
However, since copolymers O, P, AB, AC, AD and AE and homopolymer Q were not dissolved in DMF, the following conditions were employed.
Measurement device: HLC-8220GPC (manufactured by Tosoh Corporation)
Column: GMHXL+GMHXL (manufactured by Tosoh Corporation)
Column temperature: 40° C.
Detector: differential refractive index
Eluent: tetrahydrofuran (THF) solution of 50 mmol/L of $CH_3COOH$
Flow velocity: 1 mL/min
Standard sample to be used for calibration curve: monodisperse polystyrene manufactured by Tosoh Corporation, $5.26\times10^2$, $1.02\times10^5$, $8.42\times10^6$; monodisperse polystyrene manufactured by Nishio Kogyo KK, $4.0\times10^3$, $3.0\times10^4$, $9.0\times10^5$ (each number denotes a molecular weight)
Sample solution: THF solution containing a solid content of a copolymer or homopolymer in 0.2% by weight
Amount of sample solution injected: 100 μL

[Production and Evaluation of Positive Electrode Paste and Positive Electrode]

Abbreviations of raw materials used for positive electrode pastes according to Examples and Comparative Examples below are as follows.

$LiMO_2$: Lithium transition metal composite oxide, composition: $LiNi_{1/3}Mn_{1/3}Co_{1/3}O_2$ (D50: 6.5 μm, BET specific surface area: 0.7 $m^2/g$)

$LiMn_2O_4$: Lithium manganese oxide, composition: $LiMn_2O_4$ (D50: 18 μm, BET specific surface area: 0.2 $m^2/g$)

$LiFePO_4$: Lithium iron phosphate, composition: $LiFePO_4$ (D50: 1.0 μm, BET specific surface area: 10.5 $m^2/g$)

Powdery product: acetylene black (manufactured by DENKI KAGAKU KOGYO KABUSHIKI KAISHA, product name: Denka black powdery product)

FX35: acetylene black (manufactured by DENKI KAGAKU KOGYO KABUSHIKI KAISHA, product name: Denka black FX-35)

HS100: acetylene black (manufactured by DENKI KAGAKU KOGYO KABUSHIKI KAISHA, product name: Denka black HS-100)

[Production of Positive Electrode Paste]

A positive electrode paste was produced by using each copolymer, positive active material and conductive agent shown in Tables 2 to 6, as well as polyvinylidene fluoride (PVDF) as a binder and NMP as a nonaqueous solvent. Herein, in Tables 2, 3, and 5, a 12% NMP solution of #1100 manufactured by KUREHA CORPORATION was used as the PVDF; in Table 4, an 8% NMP solution of KYNAR HSV900 manufactured by Arkema Inc. was used as the PVDF. Herein, the mass ratio of the positive active material, the binder and the conductive agent was 90:5:5 (conversion of the solid content). The positive electrode paste was produced through a kneading step using a multiblender mill, in which the solid content (% by mass) was adjusted by adjusting the amount of the nonaqueous solvent. Herein, the solid content (% by mass) of the positive electrode paste is expressed as % by mass of the solid content of a material including a copolymer, a positive active material, a conductive agent and a binder which are contained in the positive electrode paste.

[Measurement of Viscosity of Positive Electrode Paste]

The viscosity of the positive electrode paste was measured by using a rheometer. For a measurement device of the rheometer, Reo Stress 6000 manufactured by HAAKE was used. For a rotor for measurement, Parallel Plate having a diameter of 35 mm was used. The measurement temperature was 25° C., a sequence for successively measuring an approach route having a shear rate of 0.0001 $s^{-1}$ to 1000 $s^{-1}$ and a return route having a shear rate of 1000 $s^{-1}$ to 0.0001 $s^{-1}$ over 200 seconds for each route. As the representative value of the viscosity, a value in the approach route having a shear rate of 10 $s^{-1}$ was defined as the viscosity of the paste.

The viscosity of the positive electrode paste according to Comparative Example corresponding to each of Examples, having the same composition except that the copolymer of the present invention was not added, was defined as "paste viscosity R." The viscosity reduction rate by the addition of the copolymer was calculated from the following expression, and the effects thereof were compared.

Viscosity reduction rate (%)={([paste viscosity $R$]−[paste viscosity])/(paste viscosity $R$)}×100.

The results of the viscosity and the viscosity reduction rate are shown in Table 2 to 4.

TABLE 2

| | Copolymer (homopolymer) | | | | | | Positive electrode paste | | | |
| --- | --- | --- | --- | --- | --- | --- | --- | --- | --- | --- |
| | Name | Constituent unit (a)/(b) (mass ratio) | Weight average molecular weight | Solubility in organic solvent (% by mass) | Type of positive active material | Type of conductive agent | Part(s) by weight of copolymer/ 100 parts by weight of conductive agent | Total part(s) by weight of constituent units (a) + (b)/100 parts by weight of conductive agent | Copolymer (% by mass) |
| Comparative Example 2 | None | — | — | — | $LiMO_2$ | Powdery product | 0 | — | 0.00 |

TABLE 2-continued

| | | | | | | | | | |
|---|---|---|---|---|---|---|---|---|---|
| Example 1 | Copolymer A | 0.21 | 55,000 | >10 | LiMO$_2$ | Powdery product | 1 | 0.85 | 0.03 |
| Example 2 | Copolymer A | 0.21 | 55,000 | >10 | LiMO$_2$ | Powdery product | 2 | 1.70 | 0.06 |
| Example 3 | Copolymer A | 0.21 | 55,000 | >10 | LiMO$_2$ | Powdery product | 4 | 3.40 | 0.12 |
| Example 4 | Copolymer A | 0.21 | 55,000 | >10 | LiMO$_2$ | Powdery product | 8 | 6.80 | 0.24 |
| Example 5 | Copolymer A | 0.21 | 55,000 | >10 | LiMO$_2$ | Powdery product | 16 | 13.60 | 0.47 |
| Example 6 | Copolymer A | 0.21 | 55,000 | >10 | LiMO$_2$ | Powdery product | 32 | 27.20 | 0.94 |
| Example 4 | Copolymer A | 0.21 | 55,000 | >10 | LiMO$_2$ | Powdery product | 8 | 6.80 | 0.24 |
| Example 7 | Copolymer A | 0.21 | 55,000 | >10 | LiMn$_2$O$_4$ | Powdery product | 8 | 6.80 | 0.24 |
| Example 8 | Copolymer A | 0.21 | 55,000 | >10 | LiFePO$_4$ | Powdery product | 8 | 6.80 | 0.22 |
| Example 9 | Copolymer A | 0.21 | 55,000 | >10 | LiMO$_2$ | FX35 | 8 | 6.80 | 0.23 |
| Example 10 | Copolymer A | 0.21 | 55,000 | >10 | LiMO$_2$ | HS100 | 8 | 6.80 | 0.28 |
| Comparative Example 2 | None | — | — | — | LiMO$_2$ | Powdery product | 0 | — | 0.00 |
| Comparative Example 3 | None | — | — | — | LiMn$_2$O$_4$ | Powdery product | 0 | — | 0.00 |
| Comparative Example 4 | None | — | — | — | LiFePO$_4$ | Powdery product | 0 | — | 0.00 |
| Comparative Example 5 | None | — | — | — | LiMO$_2$ | FX35 | 0 | — | 0.00 |
| Comparative Example 6 | None | — | — | — | LiMO$_2$ | HS100 | 0 | — | 0.00 |
| Example 4 | Copolymer A | 0.21 | 55,000 | >10 | LiMO$_2$ | Powdery product | 8 | 6.80 | 0.24 |
| Example 11 | Copolymer B | 0.21 | 35,000 | >10 | LiMO$_2$ | Powdery product | 8 | 6.80 | 0.24 |
| Example 12 | Copolymer C | 0.21 | 20,000 | >10 | LiMO$_2$ | Powdery product | 8 | 6.80 | 0.24 |
| Example 15 | Copolymer F | 0.21 | 440,000 | >10 | LiMO$_2$ | Powdery product | 8 | 6.80 | 0.24 |
| Example 16 | Copolymer G | 0.21 | 8,000 | >10 | LiMO$_2$ | Powdery product | 8 | 6.80 | 0.24 |
| Example 17 | Copolymer H | 0.73 | 221,000 | 3.2 | LiMO$_2$ | Powdery product | 8 | 7.60 | 0.24 |
| Example 13 | Copolymer D | 0.73 | 108,000 | 8.5 | LiMO$_2$ | Powdery product | 8 | 7.60 | 0.24 |
| Example 18 | Copolymer I | 0.73 | 120,000 | >10 | LiMO$_2$ | Powdery product | 8 | 7.60 | 0.24 |
| Example 20 | Copolymer K | 0.73 | 93,000 | >10 | LiMO$_2$ | Powdery product | 8 | 7.60 | 0.24 |
| Example 13 | Copolymer D | 0.73 | 108,000 | 8.5 | LiMO$_2$ | Powdery product | 8 | 7.60 | 0.24 |
| Example 19 | Copolymer J | 0.73 | 120,000 | 0.3 | LiMO$_2$ | Powdery product | 8 | 7.60 | 0.24 |
| Comparative Example 7 | Copolymer M | 0.00 | 46,000 | >10 | LiMO$_2$ | Powdery product | 8 | 6.80 | 0.24 |
| Comparative Example 8 | Copolymer N | 0.00 | 35,000 | >10 | LiMO$_2$ | Powdery product | 8 | 6.80 | 0.24 |
| Example 4 | Copolymer A | 0.21 | 55,000 | >10 | LiMO$_2$ | Powdery product | 8 | 6.80 | 0.24 |
| Example 20 | Copolymer K | 0.73 | 93,000 | >10 | LiMO$_2$ | Powdery product | 8 | 7.60 | 0.24 |
| Example 21 | Copolymer L | 0.67 | 101,000 | 8.9 | LiMO$_2$ | Powdery product | 8 | 8.00 | 0.24 |
| Example 13 | Copolymer D | 0.73 | 108,000 | 8.5 | LiMO$_2$ | Powdery product | 8 | 7.60 | 0.24 |
| Example 14 | Copolymer E | 1.71 | 57,000 | 1.5 | LiMO$_2$ | Powdery product | 8 | 7.60 | 0.24 |
| Example 22 | Copolymer O | 4.00 | 44,000 | 0.9 | LiMO$_2$ | Powdery product | 8 | 8.00 | 0.00 |
| Example 23 | Copolymer P | 4.00 | 42,000 | 4.1 | LiMO$_2$ | Powdery product | 8 | 8.00 | 0.00 |
| Comparative Example 9 | Homopolymer Q | — | 69,000 | 0 | — | — | — | — | — |
| Comparative Example 1 | None | — | — | 8.5 | LiMO$_2$ | Powdery product | 0 | — | 0.00 |

| | Positive electrode paste | | | | Positive electrode | | Discharge capacity | |
|---|---|---|---|---|---|---|---|---|
| | Solid content (% by mass) | Viscosity (mPa · s) (shear rate) 10 s$^{-1}$) | Viscosity reduction rate (%) | Coatability test (presence of deficiency of coatability) | Peeling strength (gf) | Presence of exfoliation of composite in cutting of positive electrode | Unipolar discharge capacity (mAh/g) | Discharge capacity of small prismatic battery (mAh) |
| Comparative Example 2 | 60.1 | 18,280 | 0 | Presence | 550 | Absence | 152.8 | 494 |
| Example 1 | 60.0 | 12,880 | 30 | Absence | — | Absence | — | — |
| Example 2 | 60.0 | 10,570 | 42 | Absence | — | Absence | — | — |
| Example 3 | 60.0 | 6,760 | 63 | Absence | — | Absence | — | — |
| Example 4 | 59.9 | 4,180 | 77 | Absence | — | Absence | 151.8 | 488 |
| Example 5 | 59.8 | 3,930 | 79 | Absence | — | Absence | — | — |
| Example 6 | 59.7 | 3,820 | 79 | Absence | — | Absence | — | — |
| Example 4 | 59.9 | 4,180 | 77 | Absence | 545 | Absence | 151.8 | 488 |
| Example 7 | 60.0 | 3,050 | 91 | Absence | — | Absence | — | — |
| Example 8 | 55.0 | 2,020 | 93 | Absence | — | Absence | — | — |
| Example 9 | 56.6 | 3,310 | 86 | Absence | — | Absence | — | — |
| Example 10 | 69.2 | 11,930 | 30 | Absence | — | Absence | — | — |
| Comparative Example 2 | 60.1 | 18,280 | 0 | Presence | 550 | Absence | 152.8 | 494 |
| Comparative Example 3 | 60.0 | 35,260 | 0 | Presence | — | Absence | — | — |
| Comparative Example 4 | 55.0 | 27,640 | 0 | Presence | — | Absence | — | — |

TABLE 2-continued

| | | | | | | | | |
|---|---|---|---|---|---|---|---|---|
| Comparative Example 5 | 56.6 | 28,890 | 0 | Presence | — | Absence | — | — |
| Comparative Example 6 | 69.2 | 16,940 | 0 | Presence | — | Absence | — | — |
| Example 4 | 59.9 | 4,180 | 77 | Absence | 545 | Absence | 151.8 | 488 |
| Example 11 | 59.9 | 4,310 | 76 | Absence | 500 | Absence | — | — |
| Example 12 | 59.9 | 4,310 | 76 | Absence | 470 | Absence | 151.3 | 491 |
| Example 15 | 59.9 | 4,160 | 77 | Absence | 565 | Absence | 151.7 | — |
| Example 16 | 59.9 | 5,380 | 71 | Absence | 375 | Absence | — | — |
| Example 17 | 59.9 | 4,780 | 74 | Absence | 530 | Absence | 151.7 | — |
| Example 13 | 59.9 | 3,830 | 79 | Absence | 585 | Absence | 149.9 | — |
| Example 18 | 59.9 | 4,500 | 75 | Absence | 520 | Absence | 149.4 | — |
| Example 20 | 59.9 | 4,550 | 75 | Absence | 580 | Absence | 150.0 | — |
| Example 13 | 59.9 | 3,830 | 79 | Absence | 585 | Absence | 149.9 | — |
| Example 19 | 59.9 | 5,150 | 72 | Absence | 565 | Absence | 150.3 | — |
| Comparative Example 7 | 59.9 | 19,230 | −5 | Presence | 110 | Presence | — | — |
| Comparative Example 8 | 59.9 | 20,290 | −11 | Presence | 115 | Presence | — | — |
| Example 4 | 59.9 | 4,180 | 77 | Absence | 545 | Absence | 151.8 | 488 |
| Example 20 | 59.9 | 4,550 | 75 | Absence | 580 | Absence | 150.0 | — |
| Example 21 | 59.9 | 3,440 | 81 | Absence | 595 | Absence | 150.3 | — |
| Example 13 | 59.9 | 3,830 | 79 | Absence | 585 | Absence | 149.9 | — |
| Example 14 | 59.9 | 4,760 | 74 | Absence | 570 | Absence | 151.1 | — |
| Example 22 | 59.9 | 3,200 | 82 | Absence | 555 | Absence | — | — |
| Example 23 | 59.9 | 3,480 | 81 | Absence | 525 | Absence | — | — |
| Comparative Example 9 | — | — | — | — | — | — | — | — |
| Comparative Example 1 | 59.9 | 4,380 | — | Absence | — | Absence | — | — |

TABLE 3

| | Copolymer or homopolymer | | | | | Positive electrode paste | | | |
|---|---|---|---|---|---|---|---|---|---|
| | Name | Constituent unit (a)/(b) (mass ratio) | Weight average molecular weight | Solubility in organic solvent (% by mass) | Type of positive active material | Type of conductive agent | Part(s) by weight of copolymer/ 100 parts by weight of conductive agent | Total part(s) by weight of constituent units (a) + (b)/100 parts by weight of conductive agent | Copolymer (% by mass) |
| Comparative Example 2 | None | — | — | — | — | Powdery product | 0 | — | 0.00 |
| Example 3 | Copolymer A | 0.21 | 55,000 | >10 | $LiMO_2$ | Powdery product | 4 | 3.40 | 0.12 |
| Example 24 | Copolymer E | 1.71 | 57,000 | >10 | $LiMO_2$ | Powdery product | 4 | 3.80 | 0.12 |
| Example 25 | Copolymer R | 4.00 | 53,000 | >10 | $LiMO_2$ | Powdery product | 4 | 4.00 | 0.12 |
| Example 26 | Copolymer S | 1.50 | 78,000 | >10 | $LiMO_2$ | Powdery product | 4 | 4.00 | 0.12 |
| Example 27 | Copolymer T | 1.86 | 61,000 | >10 | $LiMO_2$ | Powdery product | 4 | 4.00 | 0.12 |
| Example 28 | Copolymer U | 1.71 | 82,000 | >10 | $LiMO_2$ | Powdery product | 4 | 3.80 | 0.12 |
| Example 29 | Copolymer V | 1.50 | 100,000 | 8.9 | $LiMO_2$ | Powdery product | 4 | 4.00 | 0.12 |
| Example 30 | Copolymer X | 1.00 | 88,000 | 0.9 | $LiMO_2$ | Powdery product | 4 | 8.00 | 0.12 |
| Example 31 | Copolymer Y | 0.67 | 87,000 | 4.1 | $LiMO_2$ | Powdery product | 4 | 8.00 | 0.12 |
| Example 32 | Copolymer Z | 1.69 | 95,000 | 0 | $LiMO_2$ | Powdery product | 4 | 2.80 | 0.12 |
| Example 33 | Copolymer AA | 1.69 | 100,000 | 0.3 | $LiMO_2$ | Powdery product | 4 | 2.80 | 0.12 |
| Reference Example 1 | Copolymer O | 4.00 | 44,000 | 8.5 | $LiMO_2$ | Powdery product | 4 | 4.00 | 0.12 |
| Example 22 | Copolymer O | 4.00 | 44,000 | 0.3 | $LiMO_2$ | | 8 | 8.00 | 0.24 |
| Reference Example 2 | Copolymer W | 4.00 | 53,000 | 8.5 | $LiMO_2$ | Powdery product | 4 | 4.00 | 0.12 |
| Example 34 | Copolymer W | 4.00 | 53,000 | 1.5 | $LiMO_2$ | Powdery product | 8 | 8.00 | 0.24 |
| Example 38 | Copolymer AC | 4.00 | 46,000 | >10 | $LiMO_2$ | Powdery product | 4 | 4.00 | 0.12 |
| Example 39 | Copolymer AD | 3.04 | 36,000 | >10 | $LiMO_2$ | Powdery product | 4 | 3.80 | 0.12 |
| Reference Example 3 | Copolymer AE | 5.33 | 56,000 | 0.2 | $LiMO_2$ | Powdery product | 8 | 7.6 | 0.24 |
| Example 35 | Copolymer AE | 5.33 | 56,000 | 0.2 | $LiMO_2$ | Powdery product | 24 | 22.8 | 0.71 |
| Example 36 | Copolymer AE | 5.33 | 56,000 | 0.2 | $LiMO_2$ | Powdery product | 30 | 28.5 | 0.88 |
| Example 37 | Copolymer AB | 5.33 | 69,000 | — | $LiMO_2$ | Powdery product | 8 | — | 0.24 |
| Comparative Example 1 | None | — | — | 8.5 | $LiMO_2$ | Powdery product | 0 | — | 0.00 |

TABLE 3-continued

|  |  | Positive electrode paste | | | | Positive electrode | | Discharge capacity | |
|---|---|---|---|---|---|---|---|---|---|
|  |  | Solid content (% by mass) | Viscosity (mPa·s) (shear rate) 10 s$^{-1}$) | Viscosity reduction rate (%) | Coatability test (presence of deficiency of coatability) | Peeling strength (gf) | Presence of exfoliation of composite in cutting of positive electrode | Unipolar discharge capacity (mAh/g) | Discharge capacity of small prismatic battery (mAh) |
|  | Comparative Example 2 | 60.1 | 18,280 | 0 | Presence | 550 | Absence | 152.8 | 494 |
|  | Example 3 | 60.0 | 6,760 | 63 | Absence | — | Absence | — | — |
|  | Example 24 | 59.9 | 4,972 | 73 | Absence | 360 | Absence | 149.9 | — |
|  | Example 25 | 59.9 | 3,995 | 78 | Absence | 360 | Absence | — | — |
|  | Example 26 | 59.9 | 3,738 | 80 | Absence | 375 | Absence | 151.8 | 488 |
|  | Example 27 | 59.9 | 4,088 | 78 | Absence | 345 | Absence | 150 | — |
|  | Example 28 | 59.9 | 5,140 | 72 | Absence | 355 | Absence | 150.3 | — |
|  | Example 29 | 59.9 | 4,255 | 77 | Absence | 345 | Absence | 149.9 | — |
|  | Example 30 | 59.9 | 3,678 | 80 | Absence | 400 | — | — | — |
|  | Example 31 | 59.9 | 3,917 | 79 | Absence | 400 | — | — | — |
|  | Example 32 | 59.9 | 4,481 | 75 | Absence | 385 | Absence | 150.3 | — |
|  | Example 33 | 59.9 | 4,380 | 76 | Absence | 376 | — | — | — |
|  | Reference Example 1 | 59.9 | 31,180 | −71 | Presence | — | Absence | 150.3 | — |
|  | Example 22 | 59.9 | 3,200 | 82 | Absence | 555 | Presence | — | — |
|  | Reference Example 2 | 59.9 | 23,800 | −30 | Presence | — | Absence | 151.1 | — |
|  | Example 34 | 59.9 | 4,031 | 78 | Absence | 390 | — | — | — |
|  | Example 38 | 59.9 | 9,334 | 49 | Absence | 315 | — | — | — |
|  | Example 39 | 59.9 | 11,950 | 35 | Absence | 310 | — | — | — |
|  | Reference Example 3 | 59.9 | 24,000 | −31 | Presence | 130 | — | — | — |
|  | Example 35 | 59.9 | 15,010 | 18 | Absence | 120 | — | — | — |
|  | Example 36 | 59.9 | 10,300 | 44 | Absence | 185 | — | — | — |
|  | Example 37 | 59.9 | 13,270 | 27 | Absence | 260 | — | — | — |
|  | Comparative Example 1 | 55.0 | 4,380 | — | Absence | — | — | — | — |

TABLE 4

|  | Copolymer or homopolymer | | | | | | Positive electrode paste | | |
|---|---|---|---|---|---|---|---|---|---|
|  | Name | Constituent unit (a)/(b) (mass ratio) | Weight average molecular weight | Solubility in organic solvent (% by mass) | Type of positive active material | Type of conductive agent | Part(s) by weight of copolymer/ 100 parts by weight of conductive agent | Total part(s) by weight of constituent units (a) + (b)/100 parts by weight of conductive agent | Copolymer (% by mass) |
| Comparative Example 10 | None | — | — | — | LiFePO$_4$ | Powdery product | 0 | — | 0.00 |
| Example 40 | Copolymer A | 0.21 | 55,000 | >10 | LiFePO$_4$ | Powdery product | 4 | 3.40 | 0.10 |
| Example 41 | Copolymer E | 1.71 | 57,000 | >10 | LiFePO$_4$ | Powdery product | 1 | 0.95 | 0.03 |
| Example 42 | Copolymer E | 1.71 | 57,000 | >10 | LiFePO$_4$ | Powdery product | 2 | 1.90 | 0.05 |
| Example 43 | Copolymer E | 1.71 | 57,000 | >10 | LiFePO$_4$ | Powdery product | 4 | 3.80 | 0.10 |
| Example 44 | Copolymer E | 1.71 | 57,000 | >10 | LiFePO$_4$ | Powdery product | 8 | 4.60 | 0.21 |
| Example 45 | Copolymer E | 1.71 | 57,000 | >10 | LiFePO$_4$ | Powdery product | 16 | 15.20 | 0.41 |
| Example 46 | Copolymer E | 1.71 | 57,000 | >10 | LiFePO$_4$ | Powdery product | 32 | 30.40 | 0.81 |
| Example 47 | Copolymer E | 1.71 | 57,000 | >10 | LiFePO$_4$ | Powdery product | 64 | 60.80 | 1.61 |
| Example 48 | Copolymer X | 1.00 | 88,000 | >10 | LiFePO$_4$ | Powdery product | 4 | 4.00 | 0.10 |
| Example 49 | Copolymer Z | 1.69 | 95,000 | >10 | LiFePO$_4$ | Powdery product | 4 | 2.80 | 0.10 |
| Comparative Example 11 | None | — | — | >10 | LiMO$_2$ | Powdery product | 0 | — | 0.00 |
| Example 50 | Copolymer A | 0.21 | 55,000 | — | LiMO$_2$ | Powdery product | 4 | 3.40 | 0.11 |
| Example 51 | Copolymer E | 1.71 | 37,000 | — | LiMO$_2$ | Powdery product | 4 | 3.80 | 0.11 |

TABLE 4-continued

| | | Positive electrode paste | | | | Positive electrode Presence of exfoliation of composite in cutting of positive electrode | Discharge capacity | |
|---|---|---|---|---|---|---|---|---|
| | | Solid content (% by mass) | Viscosity (mPa·s) (shear rate) 10 s$^{-1}$ | Viscosity reduction rate (%) | Coatability test (presence of deficiency of coatability) | Peeling strength (gf) | Unipolar discharge capacity (mAh/g) | Discharge capacity of small prismatic battery (mAh) |
| | Comparative Example 10 | 52.0 | 39,100 | 0 | Presence | 340 | — | — |
| | Example 40 | 52.0 | 25,350 | 35 | Absence | 415 | — | — |
| | Example 41 | 52.0 | 28,980 | 26 | Absence | — | — | — |
| | Example 42 | 52.0 | 20,655 | 47 | Absence | — | — | — |
| | Example 43 | 51.9 | 11,570 | 70 | Absence | 475 | — | — |
| | Example 44 | 51.8 | 9,009 | 77 | Absence | — | — | — |
| | Example 45 | 51.7 | 7,608 | 81 | Absence | — | — | — |
| | Example 46 | 51.6 | 6,217 | 84 | Absence | — | — | — |
| | Example 47 | 52.0 | 6,203 | 84 | Absence | — | — | — |
| | Example 48 | 51.9 | 9,101 | 77 | Absence | 510 | — | — |
| | Example 49 | 51.9 | 11,000 | 72 | Absence | 485 | — | — |
| | Comparative Example 11 | 57.0 | 41,340 | 0 | Presence | — | — | — |
| | Example 50 | 56.9 | 27,815 | 33 | Absence | — | — | — |
| | Example 51 | 56.9 | 18,680 | 55 | Absence | — | — | — |

[Coatability Test of Positive Electrode Paste]

In this test, one surface of aluminum foil having a thickness of 20 μm was coated with the positive electrode paste while a gap of the doctor blade was appropriately adjusted such that the mass of the positive composite after drying was 17 mg/cm².

As a result, when extension of the positive electrode paste was bad and exposure (fading) of aluminum foil was observed in the coating surface excluding the end portion, deficiency of coatability was rated as "Presence".

The results of the coatability test are also shown in Table 2 to 4.

[Measurement of Time Required for Drying Positive Electrode Paste]

Among the above positive electrodes immediately after coating, some positive electrodes according to Examples and Comparative Examples were subjected to measurements of the mass before drying and the mass at every certain time after loading on a hot plate at 60° C. The time point at which the change in mass was not observed was regarded as a drying completion time, and this time was defined as a time required for drying. The measurement results of the time required for drying are shown in Table 5.

[Observation of Presence of Exfoliation of Composite in Cutting of Positive Electrode]

The above positive electrode after drying was cut into a size of 30 mm×60 mm in length by using a cutter knife, and the presence of exfoliation of a positive composite layer was observed. When exfoliation having a width of 1 mm or more was observed, adhesiveness was rated as deficiency. This test was carried out by using a positive electrode in which only one surface of aluminum foil was coated with the positive electrode paste.

The observation results of the presence of exfoliation of the composite having a width of 1 mm or more are also shown in Tables 2 and 3.

[Measurement of Peel Strength of Positive Electrode]

The above cut positive electrode was pulled at a speed of about 2.3 cm/s with a mending tape (manufactured by Scotch, product number: MP-18S) stuck on the surface of the positive composite layer such that an angle between the surface of the tape and the positive electrode was 180°. The stress at this time was measured by using a push-pull gauge (manufactured by IMADA CO., LTD., DIGITAL FORCE GAUGE DPS-2). An average value of the measurement values excluding unstable values at the beginning and the end of peeling was calculated and defined as a peel strength. The measurement values of the peel strength are shown in Tables 2 to 4.

TABLE 5

| | | Positive electrode paste | | | | | Positive electrode Peeling strength (gf) |
|---|---|---|---|---|---|---|---|
| | Copolymer Name | Part(s) by weight of copolymer/100 parts by weight of conductive agent | Solid content (% by mass) | Time required for drying (min) | Viscosity mPa·s (shear rate: 10 s$^{-1}$) | Coatability test (presence of deficiency of coatability) | |
| Comparative Example 1 | None | 0 | 56 | 66 | 4,380 | Absence | — |
| Comparative Example 2 | None | 0 | 60 | 55 | 18,280 | Presence | 550 |
| Example 4 | Copolymer A | 8 | 60 | 55 | 4,180 | Absence | 545 |

[Unipolar Discharge Capacity Test]

The above positive electrode after drying was cut into a size of 20 mm×20 mm. The positive composite of the end portion with a width of 5 mm was carefully removed by using a cotton swab or a tip end of a cutter to allow an aluminum foil portion to be exposed. A rod made of stainless steel (product number: SUS304) was attached to this exposed portion of the aluminum foil by resistance welding. The resultant was dried at 150° C. under reduced pressure for 24 hours to produce a positive electrode for evaluating charge-discharge performance. The mass of the positive active material in the positive electrode was about 43 mg. In an argon atmosphere, this positive electrode and a counter electrode made of lithium metal and a reference electrode were set to a glass beaker having a lid. For the electrolyte solution, one obtained by dissolving 1 mol/L of $LiPF_6$ in a mixed solvent of ethylene carbonate (EC):diethyl carbonate (DEC):ethyl methyl carbonate (EMC)=25:35:40 (volume ratio) was used. Thus, a nonaqueous electrolyte battery for a unipolar discharge capacity test was produced.

This nonaqueous electrolyte battery was charged to 4.3 V at a constant current of 1 hour rate (1 CmA=7.5 mA), and subsequently subjected to constant voltage charge at 4.3 V for three hours in total. Thereafter, it was discharged to 2.5 V at a discharge current of 5 hour rate (0.2 CmA=1.5 mA), and this discharge capacity was divided by the mass of the positive active material to obtain discharge capacity (mAh/g) per positive active material. The results of the discharge capacity test of the positive electrode are also shown in Tables 2 and 3.

[Production of Small Prismatic Battery]

For a charge-discharge capacity determination test of a battery, a small prismatic battery 1 was produced.

Both surfaces of aluminum foil having a thickness of 20 μm were coated with positive electrode pastes according to some Examples and Comparative Examples by using a doctor blade, and dried by using a hot plate at 60° C. When the both surfaces were coated with the positive electrode pastes, every one surface was coated and dried. Next, compression forming was carried out by a roll press so that the thickness was 130 μm (including a current collector), to produce a positive electrode 3 having a length of 640 mm and a width of 30 mm. In a portion in which a composite layer was not formed, a positive electrode lead 10 was provided by ultrasonic welding.

Hardly graphitizable carbon and a PVDF solution were mixed with each other in a mass ratio of 90:10 (solid content conversion), and NMP was added thereto to produce a negative electrode paste whose solid content was adjusted. Both surfaces of copper foil having a thickness of 10 μm were coated with the negative electrode paste by using a doctor blade, and dried by using a hot plate at 80° C. When the both surfaces were coated with the negative electrode paste, every one surface was coated and dried. Next, compression forming was carried out by a roll press so that the thickness was 140 μm (including a current collector), to produce a negative electrode 4 having a length of 600 mm and a width of 31 mm. In a portion in which a composite layer was not formed, a negative electrode lead 11 was provided by ultrasonic welding.

As a separator 5, a polyethylene microporous film having a length of 1300 mm, a width of 34 mm, and a thickness of 25 μm was used. As a nonaqueous electrolyte, one obtained by dissolving 1 mol/L of $LiPF_6$ in a mixed solvent of ethylene carbonate (EC):diethyl carbonate (DMC):ethyl methyl carbonate (EMC)=25:35:40 (volume ratio) was used.

The positive electrode 3, the separator 5 and the negative electrode 4 were superimposed sequentially, and the superimposed product was wound in an oblong spiral shape around a rectangular winding core made of polyethylene.

This power generating element 2 was accommodated in a prismatic battery case 6 made of aluminum, then a positive electrode lead 10 was led out from a positive electrode current collector to be welded to a battery lid 7, a negative electrode lead 11 was led out from a negative electrode current collector to be welded to a negative electrode terminal 9, and thereafter, an electrolyte solution was injected. Next, the battery lid 7 and the battery case 6 were laser welded to each other to allow airtightness in the battery 1 to be kept, thus producing a small prismatic battery having a design capacity of 480 mAh.

[Capacity Determination Test of Small Prismatic Battery]

Each battery was charged to 4.2 V at a constant current of 1 hour rate (1 CmA=480 mA), and subsequently, subjected to constant voltage charge at 4.2 V for three hours in total. Thereafter, it was discharged to 2.5 V at a discharge current of 1 CmA, and the discharge capacity of the small prismatic battery was observed. The results are also shown in Tables 2 and 3.

[Test Results and Consideration]

[Paste Solid Content, Drying Speed, and Time Required for Drying]

Example 4 and Comparative Examples 1 and 2 show that a positive electrode paste having a high solid content has a short time required for drying after coating regardless of the presence of a copolymer.

This shows that when the content rate of NMP in the paste is reduced, namely, when the solid content of the positive electrode paste is increased, the time required for drying can be shortened.

[Paste Solid Content and Paste Viscosity]

As can be seen from the comparison between Comparative Examples 1 and 2, when the paste solid content is increased, fading occurs in coating. The fading of the positive electrode can be described to be due to shortage of the fluidity of the paste, that is, due to high viscosity.

The positive electrode paste of Example 4 has a high solid content of the paste as in the case of Comparative Example 2, but the addition of copolymer A can reduce the paste viscosity to the same level as that of Comparative Example 1, and thus, fading in coating of the positive electrode can be solved.

[Determination of Effect of Reducing Paste Viscosity]

From Examples 4 and 7 to 10, and Comparative Examples 2 to 6 corresponding to the respective Examples, even when various positive active materials and conductive agents are used, the effect of reducing the paste viscosity by copolymer A can be confirmed. The absolute value of the paste viscosity is changed depending upon the type of the positive electrode material and the solid content of the paste, and thus it is reasonable that, in order to confirm the effect of the addition of copolymer A, not the absolute values of the viscosity but the viscosity reduction rates are compared with each other. From the results of the viscosity reduction rates, in all pastes, the effect of reducing the paste viscosity by the addition of copolymer A are confirmed.

[Amount of Copolymer Added]

FIG. 1 is a plot of the viscosities of the positive electrode pastes in Examples 1 to 6 and Comparative Example 2. As is apparent from FIG. 1, as the amount of the copolymer added is increased, the paste viscosity is reduced. However, as the amount of the copolymer added is increased, the effect of reducing the viscosity corresponding to the amount added is not easily obtained. Therefore, the amount of the copolymer added is preferably 1 to 16% in mass ratio of the conductive agent.

[Discharge Characteristics of Positive Electrode and Battery]

From the comparison of Examples 4, 12 to 15, and 17 to 21 with Comparative Example 2, it can be seen that the discharge capacity per mass of the positive active material of each Example is comparable to that of Comparative Example 2.

From the comparison of Examples 4 and 12 with Comparative Example 2, it can be seen that the discharge capacity of the small prismatic battery of each Example is also comparable to that of Comparative Example 2.

[Mass Ratio of Constituent Unit (a) to Constituent Unit (b)]

From Examples 35 to 37 and Reference Example 3, it can be seen that when the mass ratio (a)/(b) of the constituent unit (a) and the constituent unit (b) is a large value, the copolymer which does not easily achieve the effect of reducing the paste viscosity is present. The reason for this is considered because the rate of the constituent unit (b) is too small in the copolymer and thus the effect of suppressing aggregation of particles in the paste due to a steric repulsive force between particles, which is brought about by the constituent unit (b), is small. Thus, it is preferable that the mass ratio (a)/(b) of the constituent unit (a) and the constituent unit (b) is not too large.

Even in the case of the copolymer which does not easily achieve the effect of reducing the paste viscosity, the content of the copolymer in the paste can be increased to thereby exert the effect of reducing the paste viscosity.

[Type of Binder]

Examples and Comparative Examples shown in Table 4 show the results where the binder in the paste is changed into PVDF having a higher molecular weight. The binder is preferably changed to a binder having a higher molecular weight because the positive composite peel strength can be enhanced. In particular, this is preferable when the positive electrode is produced by using a positive active material with high bulk, a finely particulate positive active material, a positive active material coated with carbon, or the like.

From Table 4, also when the type of the binder is changed, the effect of reducing paste viscosity by the addition of the copolymer is recognized.

Furthermore, it can be seen from the comparison between Example 3 and Example 50 and the comparison between Example 24 and Example 51 that when a binder having a lower molecular weight is used as the binder in the paste, a more excellent effect of reducing paste viscosity is achieved. Therefore, as long as the peel strength of the positive composite is not affected, the binder in the paste is preferably a binder having a low molecular weight.

Furthermore, it can be seen that from Comparative Examples 7 and 8 that a copolymer which does not achieve the effect of reducing paste viscosity is present.

It can be thus seen that, in order to secure the effect of reducing paste viscosity and the peel strength of the positive composite, the structure of a copolymer is extremely important. The detail thereof is considered as follows.

It is considered that the copolymers of Comparative Examples 7 and 8 do not include the constituent unit (a) and thus do not have a sufficient effect of adsorbing to the positive active material or the conductive agent. Furthermore, it is considered that, at the same time, the copolymers, not adsorbing, adsorb to PVDF to lower the adhesiveness of the positive composite to aluminum foil.

Furthermore, although not shown here, the present inventors have confirmed that also in the case where the copolymers used in Comparative Examples 7 and 8 are added in a large amount, the effect of reducing paste viscosity is not exerted.

As described above, the present invention can provide a positive electrode having a short time required for production and high adhesiveness of a positive composite to a current collector without deteriorating coatability of a positive electrode paste or adhesiveness of the positive composite after coating, and a battery using the same.

The present invention is described in detail with reference to specific embodiments, but it is apparent to persons skilled in the art that various modifications and alterations can be made without departing from the scope and spirit of the present invention.

This application is based on Japan Patent Application (JP-A-2012-085004) filed on Apr. 3, 2012, the disclosure of which is herein incorporated by reference. Furthermore, all references cited herein are incorporated in their entirety.

DESCRIPTION OF REFERENCE SINGS

1: nonaqueous electrolyte secondary battery
2: power generating element
3: positive electrode
4: negative electrode
5: separator
6: battery case
7: battery lid
8: safety valve
9: negative electrode terminal
10: positive electrode lead
11: negative electrode lead

The invention claimed is:
1. A positive electrode for a battery, comprising:
a positive active material;
a conductive agent;
a copolymer; and
polyvinylidene fluoride,
wherein the copolymer includes a constituent unit (a) represented by a following general formula (1) and a constituent unit (b) represented by a following general formula (2):

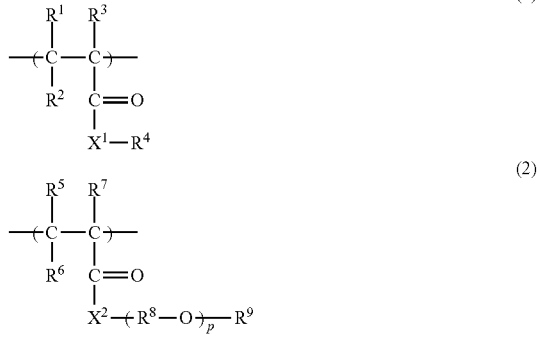

wherein $R^1$, $R^2$, $R^3$, $R^5$, $R^6$, $R^7$, and $R^9$ are the same or different and denote a hydrogen atom, a methyl group or an ethyl group, $R^4$ denotes a hydrocarbon group having more than 12 and 30 or less carbon atoms, $R^8$ denotes a linear or branched alkylene group having 2 to 4 carbon atoms, $X^1$ and $X^2$ denote an oxygen atom or NH, and p denotes a number of 1 to 50, the copolymer has a weight average molecular weight of 9000 to 1000000, a total content of the constituent unit (a) and the constituent unit (b) included in the copolymer based on 100 parts by mass of the conductive agent is 0.5 to 30 parts by mass, and a content of the copolymer in the positive electrode is 0.03 to 0.5 mass %.

2. The positive electrode for a battery according to claim 1, which is produced by using a positive electrode paste for a battery, the paste including:
the positive active material,
the conductive agent,
a solvent,
the copolymer, and
the polyvinylidene fluoride.

3. The positive electrode for a battery according to claim 1, wherein a mass ratio of the constituent unit (a) to the constituent unit (b) (constituent unit (a)/constituent unit (b)) in the copolymer is 0.1 to 10.0.

4. The positive electrode for a battery according to claim 1, wherein a total content of the constituent unit (a) and the constituent unit (b) in the copolymer is 40% by mass or more.

5. The positive electrode for a battery according to claim 1, wherein a content of the copolymer is 0.5 to 30 parts by mass based on 100 parts by mass of the conductive agent.

6. The positive electrode for a battery according to claim 1, wherein a content of the constituent unit (a) in the copolymer is 5% by mass or more and 90% by mass or less.

7. The positive electrode for a battery according to claim 1, wherein a content of the constituent unit (b) in the copolymer is 10% by mass or more and 85% by mass or less.

8. The positive electrode for a battery according to claim 1, wherein the number of carbon atoms of $R^4$ in the general formula (1) is more than 12 and 26 or less.

9. The positive electrode for a battery according to claim 1, wherein p in the general formula (2) is 1 or more and 35 or less.

10. The positive electrode for a battery according to claim 1, wherein $X^1$ in the general formula (1) is an oxygen atom.

11. The positive electrode for a battery according to claim 1, wherein $R^3$ in the general formula (1) is a hydrogen atom or a methyl group.

12. The positive electrode for a battery according to claim 1, wherein $R^1$ and $R^2$ in the general formula (1) are a hydrogen atom.

13. The positive electrode for a battery according to claim 1, wherein $X^2$ in the general formula (2) is an oxygen atom.

14. The positive electrode for a battery according to claim 1, wherein $R^7$ in the general formula (2) is a hydrogen atom or a methyl group.

15. The positive electrode for a battery according to claim 1, wherein $R^5$ and $R^6$ in the general formula (2) are a hydrogen atom.

16. The positive electrode for a battery according to claim 1, wherein $R^6$ in the general formula (2) is an ethylene group or a propylene group.

17. The positive electrode for a battery according to claim 1, wherein the positive electrode is produced by using a positive electrode paste for a battery, the positive electrode paste having a viscosity reduction rate of more than 0.

18. The positive electrode for a battery according to claim 1, wherein a peel strength of a positive composite layer of the positive electrode for a battery is more than 120 gf.

19. A battery comprising the positive electrode for a battery according to claim 1.

20. The positive electrode for a battery according to claim 1, wherein the total content of the constituent unit (a) and the constituent unit (b) included in the copolymer based on 100 parts by mass of the conductive agent is 1 to 25 parts by mass.

21. The positive electrode for a battery according to claim 1, wherein the total content of the constituent unit (a) and the constituent unit (b) included in the copolymer based on 100 parts by mass of the conductive agent is 2 to 20 parts by mass.

22. The positive electrode for a battery according to claim 1, wherein the total content of the constituent unit (a) and the constituent unit (b) included in the copolymer based on 100 parts by mass of the conductive agent is 5 to 15 parts by mass.

23. The positive electrode for a battery according to claim 1, wherein the content of the copolymer in the positive electrode is 0.1 to 0.5 mass %.

24. The positive electrode for a battery according to claim 1, wherein the positive active material comprises a lithium transition metal composite oxide represented by $Li_xMO_{2-\delta}$ where M denotes transition metals including Co, Ni and Mn, $0.4 \leq x \leq 1.2$, $0 \leq \delta \leq 0.5$.

* * * * *